(12) United States Patent
Wender

(10) Patent No.: US 10,607,193 B1
(45) Date of Patent: Mar. 31, 2020

(54) EVENT MONITORING SYSTEM

(71) Applicant: WhenPlace, Inc., New York, NY (US)

(72) Inventor: David R. Wender, New York, NY (US)

(73) Assignee: WhenPlace, Inc., New York, NY (US)

( * ) Notice: Subject to any disclaimer, the term of this patent is extended or adjusted under 35 U.S.C. 154(b) by 0 days.

(21) Appl. No.: 16/160,865

(22) Filed: Oct. 15, 2018

Related U.S. Application Data

(60) Provisional application No. 62/713,450, filed on Aug. 1, 2018.

(51) Int. Cl.
 *G06Q 10/10* (2012.01)
(52) U.S. Cl.
 CPC .............................. *G06Q 10/1095* (2013.01)
(58) Field of Classification Search
 CPC ................................................ G06Q 10/1095
 See application file for complete search history.

(56) References Cited

U.S. PATENT DOCUMENTS

| | | | |
|---|---|---|---|
| 7,139,722 B2 * | 11/2006 | Perrella | G06Q 10/063116 705/7.19 |
| 8,538,458 B2 | 9/2013 | Haney | |
| 8,688,779 B2 | 4/2014 | Bocking et al. | |
| 9,730,025 B2 | 8/2017 | Yuen et al. | |
| 2007/0264969 A1 * | 11/2007 | Frank | H04W 4/029 455/404.2 |
| 2008/0070593 A1 * | 3/2008 | Altman | H04W 4/029 455/457 |
| 2010/0175001 A1 | 7/2010 | Lazarus et al. | |
| 2010/0211425 A1 | 8/2010 | Govindarajan | |
| 2011/0205850 A1 * | 8/2011 | Annambhotla | G06Q 10/109 368/14 |
| 2012/0191501 A1 | 7/2012 | Olliphant | |
| 2013/0281112 A1 | 10/2013 | Sabatelli et al. | |
| 2013/0282421 A1 * | 10/2013 | Graff | G06Q 10/1093 705/7.18 |
| 2013/0337789 A1 | 12/2013 | Johnson | |
| 2014/0365107 A1 | 12/2014 | Dutta et al. | |

OTHER PUBLICATIONS

WHO, Inc., "When Your Friends Are", Copyright 2017, Created in Atlanta GA, retrieved from http://www.getwoh.co/ on Dec. 11, 2018, 4 pages.

(Continued)

*Primary Examiner* — Alan S Miller
*Assistant Examiner* — Arif Ullah
(74) *Attorney, Agent, or Firm* — Kilpatrick Townsend & Stockton LLP

(57) ABSTRACT

Provided are systems, methods, and computer-readable medium for an event monitoring system. In various implementations, the event monitoring system can enable tracking of the computing devices of only attendees to an event and in a time period defined by the event. Using the tracking data, the system can determine when the computing devices of the attendees are expected to arrive at an event location. The system can provide this information, and possibly also data related to the location of the computing devices, to only the event attendees. Once the event has concluded, the system can delete the tracking data and any other data related to the event.

21 Claims, 8 Drawing Sheets

(56) References Cited

OTHER PUBLICATIONS

Konverge, Inc., "Meeting up, simplified", retrieved from https://web.archive.org/web/20180805152602/http://konvergeapp.com/ Dec. 11, 2018, 8 pages.
International Search Report and Written Opinion for International Application No. PCT/US2019/044707, dated Oct. 25, 2019, 14 pages.

* cited by examiner

800

---

Receiving input corresponding to a calendar data entry, the calendar data entry adding an event to a calendar file, wherein the calendar data entry includes an event start time, an event geolocation, and a user identifier
802

↓

At a first point in time relative to the event start time, obtaining tracking data for a device associated with the user identifier
804

↓

Determining, using the tracking data, an approximate geolocation of the device
806

↓

Determining, using the approximate geolocation, an approximate time difference between a current time and a time when the device will be at the event geolocation
808

↓

Updating a location status associated with the user identifier, the location status indicating the approximate time difference
810

↓

At a second point in time relative to the event start time, disabling tracking of the device
812

↓

At a third point in time after the second point in time, deleting the tracking data
814

*FIG. 8*

EVENT MONITORING SYSTEM

CROSS-REFERENCES TO RELATED APPLICATIONS

This application claims priority to U.S. Provisional Application No. 62/713,450, filed on Aug. 1, 2018, which is hereby incorporated by reference herein in its entirety.

BRIEF SUMMARY

Provided are systems, methods, including computer-implemented methods, and computer-program products for an event monitoring system. In various examples, the event monitoring system can enable attendees to a calendar event, as well as other individuals, to use network-connected computing devices to see when the computing devices of the attendees will arrive at the event location, and possibly also where the computing devices of the attendees are presently located. This information can facilitate the planning and running of an event.

BRIEF DESCRIPTION OF THE DRAWINGS

Illustrative examples are described below in detail with reference to the following figures:

FIG. 8 includes a flowchart illustrating an example of a process for monitoring a calendar event.

DETAILED DESCRIPTION

Figure 1:
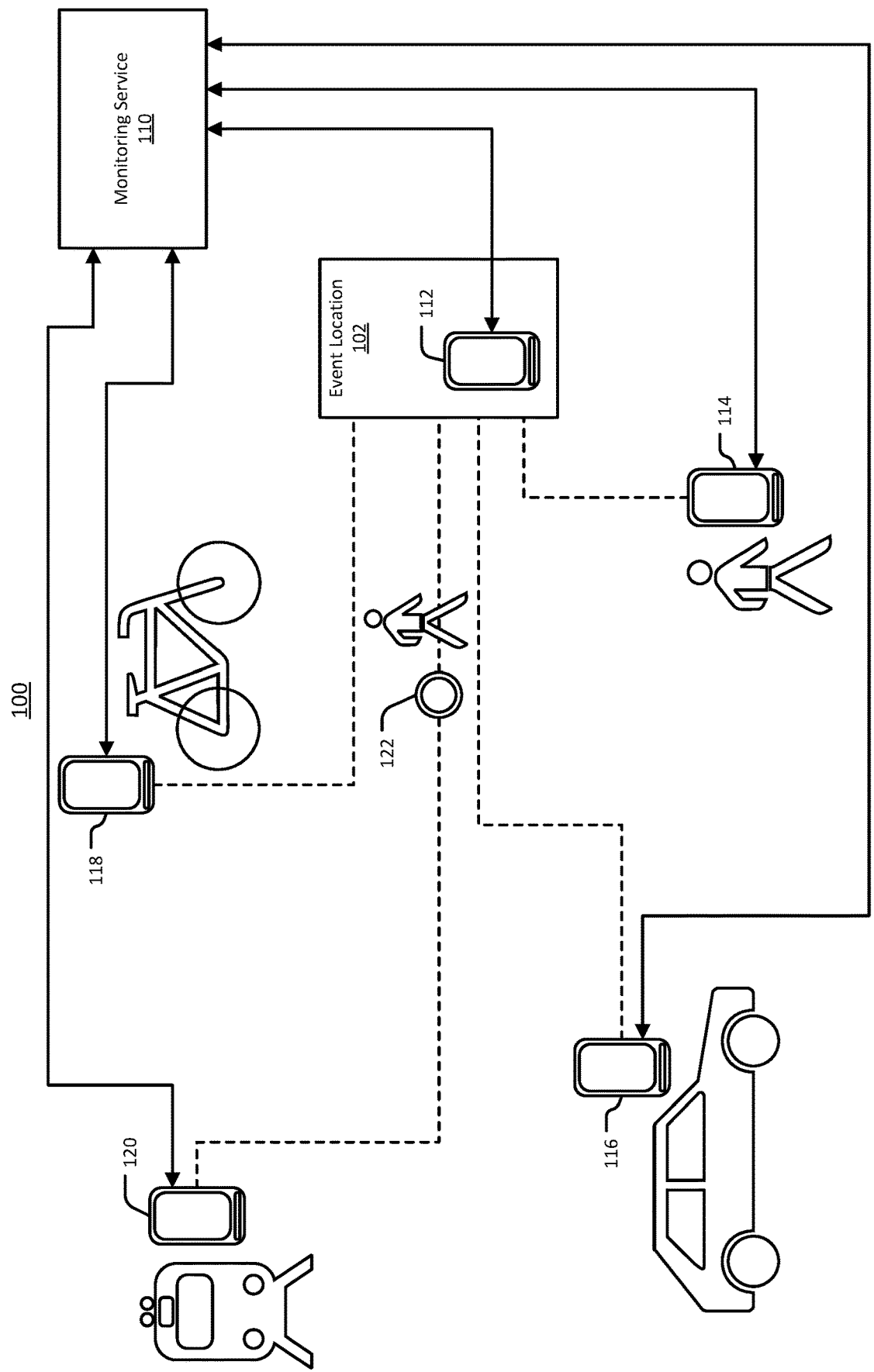
FIG. 1 includes a diagram that illustrates an example of the operation of an event monitoring system.

Computing devices enable people to manage schedules and events using calendar applications. Using a computing device, such as a computer or a smart phone, a person can set up calendar events in applications such as Google Calendar, Apple Calendar, Outlook, or a web browser. A calendar event can include parameters such as a date, a start time, an end time, and/or a location. In some examples, a calendar application can send alerts related to a calendar event. For example, the calendar application can generate a visual reminder (using, for example, a pop-up window) a certain time period before the event is to start, and/or can generate a noise, send a text message, send an email, or generate another kind of notification. In some examples, a calendar application can indicate when calendar events overlap, so that scheduling conflicting events can be avoided. In some examples, a calendar application can link a calendar event with a mapping application, so that a user can trigger the mapping application from the calendar event, and thereby see the location of the event on a map and/or obtain directions to the event. In these and other examples, calendar applications can assist people in tracking schedules and getting to appointments.

In some cases, a calendar application can also aid in organizing people invited to attend an event. For example, the calendar application can enable a user to specify other users who are invited to join an event. In some examples, once the calendar event has been generated, the calendar application can notify the invited users, for example by sending by email, text message, or another digital communication format information about the calendar event to the invited users. In some examples, the calendar application can further keep track of users who have accepted the invitation, who have declined the invitation, and/or who have not responded to the invitation. In some cases, the list of invited users and whether these users have responded to the invitation to join the event is visible to the user who generated the event. In some cases, the list of invited users and the users' invitation status is also visible to the invited users, though this may not always be the case.

It is often the case that, even with the assistance of calendar applications, people who have indicated that they will be at an event will be arrive late. Alternatively, it may simply be that the attendees will be arriving at different times. In these and other situations, the attendees to an event may want to know when the other attendees will be arriving. For example, if the event is a dinner party at a restaurant, the first person to arrive at the restaurant may want to inform the restaurant when the other attendees will arrive. It could also happen that attendees to an event decide to change the plan without updating the calendar event, resulting in some of the attendees knowing the alternated plans while others do not. For example, a group of attendees for a dinner party at a restaurant may have arrived and decided to go next door instead, leaving the remaining attendees uninformed of the change of plans.

Many people carry network-enabled computing devices, such as smart phones and tablet computers, throughout the day, and these computing devices provide one solution for coordinating attendees to an event. For example, a person can call, text, send an instant message, or email attendees to ask the attendees when they will be arriving at the event or where the attendees currently are. But sending a text message or an email may not be possible in certain situations. For example, while walking, a person can stop and send a message, but may not be able to do so while driving a car. Phone calls, text messages, and email have a further shortcoming, in that these forms of communication require the person being contacted to respond, which the person might not do if the person is also driving or is otherwise unable to use a computing device at the given moment. Such notifications are also more intrusive to the receiver as the receiver will receive an alert for each incoming message. A further problem is that the list of people who are expected to be at an event may not be readily available.

When more than two people are attending to an event, additional coordination difficulties can arise. For example, a person running late must decide who else in the group to inform about being late, or would need to initiate a group message, neither of which is an ideal solution. In the case that only one other attendee is contacted, if that person is also late, then it is likely that the status of who is late does not get passed to others in the group that are on time. Initiating a group message may require looking up who the other attendees are and/or deciding on an application to use for the group message, and the application selected may be one that not all of the other attendees use or pay attention to.

Attendees to an event may also struggle with determining an appropriate time for contacting other attendees. For example, if one person arrives exactly on time and does not find any of the other attendees at the event location, the person may be hesitant to immediately contact the other attendees to ascertain when they will arrive. Sending a message one minute after arrival time can be considered rude or intrusive, particularly when the other attendees are only a few minutes behind. Often, however, the first to arrive may delay sending messages for 10-15 minutes to avoid being rude, and if the other attendees are running quite late, the first to arrive may become frustrated and impatient with the delay.

Many mobile computing devices have location capabilities, which enable the geographic location of the computing device to be determined. A computing device can include, a Global Positioning System (GPS) receiver, for example, and/or can use cellular tower tracking and/or triangulation to determine the device's location. Location capabilities can provide another method by which the attendees to an event can be located and the time of arrival of the attendees to be determined. For example, using the location capabilities of a computing device, the location of the computing device can be tracked, and the tracking information can be used to determine when the computing device (and the person carrying the computing device) will reach an event location, how far away (distance) the device/person is from the event location, and/or the exact location of the person/device relative to the event location.

Tracking people through the computing devices used by the people may be problematic, however. Tracking services tend to have few boundaries, and thus only vary between off (e.g., no location data is available for a device) and on (e.g., the device is being tracked all the time). Additionally, when on, the location data provided by a tracking service can be fairly precise. For reasons of privacy, safety, mental discomfort, or other reasons, many people object to being tracked all the time through their devices, and may further object to provided their exact location. In certain circumstances, however, such as in relation to a calendar event, people may be willing to allow a limited amount of tracking of their devices, and may further allow at least some degree of information about their location to be available to others that are attending the event.

In various implementations, a system where location tracking of a computing device is only enabled in relation to a calendar event can enable attendees to the event, as well as other individuals, to determine when attendees to the event will arrive and/or the attendees' location before, during, and/or after the event. For example, an event monitoring system can be configured to begin tracking the computing devices of attendees at a point in time prior to the start of the event, such as 30 minutes or an hour before the start of the event. The event monitoring system can further only enable tracking of computing devices of users who have indicated an intention to attend the event, and not for users who have declined to join the event or who did not respond to the invitation to join. As a further example, the event monitoring system can show tracking information only to other attendees to the event, and possibly also to other users, such as a user who set up the event, but not to others. The tracking information can include a precise location or only an approximate distance from the event location. Alternatively the tracking information can include only an expected time of arrival and no location information. Once the event has ended or at a point in time shortly thereafter (or even before), the event monitoring system can delete all the tracking data, since the event is over and there is no further need for the data.

In various implementations, event monitoring system can automate the monitoring of an event, and can provide simple interfaces for users. For example, once a calendar event has been created and the event has been registered with the event monitoring system, the event monitoring system can determine which user devices to track, when the tracking should start, when the tracking should stop, and when the tracking data should be deleted. To register a calendar event with the event monitoring system, a user can, for example, add the event monitoring system as an invitee to the event. In this example, as an invitee, the event monitoring system can obtain the parameters of the event through the invitation. As another example, the event monitoring system can provide a software application that can be linked to a user's calendar. In this example, the user can generate an event in the event monitoring system's software application, and the event monitoring system can add the event to the linked calendar, as well as registering the event for monitoring. Alternatively or additionally, in some examples, when a user generates a calendar event in a calendar that is linked to the event monitoring system's software application, the software application can automatically register and enable monitoring of the event.

FIG. 1 includes a diagram that illustrates an example of the operation of an event monitoring system 100. In various examples, the event monitoring system 100 includes a monitoring service 110 that can manage calendar events, mange lists of users associated with calendar events, track devices of users who are attending an event, and provide the tracking data through the client devices. In various examples, the monitoring service 110 can be implemented using various software processes executing on server computers, as discussed further below. In various examples, the monitoring service 110 can also include software applications that can execute on user devices, through which users can interact with the monitoring service 110.

The monitoring service 110 can enable tracking of computing devices, but only for users that have given the monitoring service 110 permission to be tracked, only for client devices that are registered to be tracked, and only in relation to a calendar event that has been registered for tracking.

A calendar, as described herein, is a digital representation of the days, weeks, months, and years by which time is measured. In various examples, the data that comprises a calendar can be stored in a digital file. An example of a digital file format for calendars is iCalendar. In addition to being able to illustrate and track time, electronic calendars can also store meetings, appointments, tasks, and other information that can be associated with a date and/or a time. Herein, meetings, appointments, tasks, and any other data that can be stored in a calendar, and can be associated with a particular date and/or time, will be referred to as a calendar event.

In various examples, the calendar event provides parameters for determining when to enable tracking and which devices to track. A calendar event can generated using a calendar application executing on a computing device, through a web browser that gives access to a web-based calendar or calendar interface, using a software application that includes calendar functionality and/or is linked to a calendar application or a calendar file, or using another software application. A calendar event can include, for example, parameters such as a date, a start time (e.g., an hour or hour and minute), and an event location 102, which can be provided as a street address, using GPS coordinates, as a waypoint on a map, and/or with a latitude and longitude, among other examples. In some examples, the parameters can also include an end date and/or time. In various examples, the parameters of a calendar event can be stored in a structured format in a calendar file.

In various examples, the parameters of a calendar event can further include a list of users who have been invited to join the event. A user, in this context, is a digital entity that is maintained by a computing system, and for which various types of digital identifiers may exist that associate data with the user. For example, a user can be identified to a computing system by a username, which can be an alphanumeric string. In this example, the username can be associated with a user account on the computing system and/or on a network. The user account can further be associated with authentication data, such as a password, a security token, bioinformatic data, or other data that can be used to give a person access to the account, or to give the account access to the computing system. As another example, a user can be identified by an email address, a social media handle (e.g., a type of username), a gaming handle, a mobile telephone number, or another type of identifier. In some examples, one user can be associated with multiple user accounts. In some examples, one user can be associated with multiple email addresses, social media handles, or other identifiers. In some examples, more than one person (e.g., a human being) can be associated with the same user. For example, a team of network administrators may each have access to the same user account.

Users can be invited to join a calendar event in various ways. For example, the user who generates the calendar event can specify user names, social media handles, or email addresses for the invitees. Users invited to join a calendar event may be referred to herein as invitees. In various examples, a calendar application can notify the invitees about the event by sending the invites an email, an instant message, a text message, a post to a social media page, or through another form of digital communication. In some examples, the calendar application can also add the calendar event to the calendars of the invitees. In various examples, the invitee users can accept or decline the invitation to join the event through the email or other communication that notifies the invitees of the event, and/or through a calendar application.

In various examples, the calendar application can associate a status with each invitee user. For example, when the calendar event is first generated, each of the invitees users can be assigned the status "invited." When an invitee user accepts the invitation to join the event, the user's status can be changed from "invited" to "accepted" or "attending." Herein, users whose status is "accepted" or "attending" will be referred to as attendees. When an invitee users declines the invitation, the user's status can be changed from "invited" to "declined" or "not attending." Users who do not respond to the invitation can be left in an "invited" state. In various examples, each user's state can be stored as a parameter of the calendar event.

In various examples, the user who generates the calendar event can be considered the "owner" or "administrator" of the event. In these examples, the owner user's status in the calendar event can default to "attending." In some cases, only the owner of a calendar event can add or remove invitees or make other changes to the parameters of the event. In some cases, other users can make changes to the event. For example, an owner or administrator can enable any user to make changes, or enable invitees to make changes. Alternatively or additionally, an owner or administrator can designate other users as owners or administrators of the calendar event. In some cases, only an owner or administrator of a calendar event can cancel or delete the calendar event. When a calendar event is canceled, in various examples, the calendar application notifies the attendees or all invitees that the event has been canceled.

In various examples, the owner of a calendar event can register the calendar event with the monitoring service 110 so that attendees to the event can be tracked. As discussed further below, various techniques can be used to register a calendar event with the monitoring service 110. For example, the monitoring service 110 can be added as an invitee to the calendar event. As another example, a calendar file can be linked to the monitoring service 110, so that, when an event is added to the calendar file, the event is automatically registered for monitoring. Linking can be accomplished, for example, enabling a calendar feed from the calendar file to the monitoring service 110. As another example, a calendar event can be generated using the software application provided by the monitoring service 110, and by being generated in the software application, the calendar event will be registered for tracking. In this example, the calendar event can also be added to a linked calendar. As another example, the software application can link directly to a user's calendar, which may be accessible to the user and the software application through the user's computing device (e.g., mobile phone or another computing device). In these and other examples, the calendar application can provide an Application Programming Interface (API) that enables the software application to access the calendar.

In various examples, the monitoring service 110 can verify whether invitees to an event are registered with the monitoring service 110. Registration indicates a basic consent to be tracked. In some examples, the monitoring service 110 can verify whether a user is registered when the calendar event is registered with the monitoring service 110, when a user is invited to join the calendar event, and/or when the user accepts the invitation to join. When a user is not registered with the monitoring service 110, the monitoring service 110 can send the user an invitation to register with the service by email, text message, instant message, or another form of digital communication. In some examples, the user's status as not registered is indicated to the owner of the calendar event, with a suggestion that the owner send the user a personal invitation to join the monitoring service 110.

In various examples, users who do not register with the monitoring service 110 will not be tracked. That is, though a user has accepted an invitation to join the calendar event, the monitoring service 110 will not collect tracking data for the user, and will not provide the user's location or estimated time of arrival at the event to other attendees to the event.

Alternatively, in some examples, the monitoring service 110 can enable temporary tracking or one-time tracking for only the one calendar event, with registration with the monitoring service 110 not being required. In these examples, the monitoring service 110 can request a username that the monitoring service 110 can use to obtain tracking data for the non-registered user. The monitoring service 110 can further enable only basic tracking for the non-registered user, such as providing, to other attendees, only an estimated time of arrival for the non-registered user. Information provided to the non-registered user can similarly be limited. For example, the monitoring service 110 can hide the identities of other attendees from the non-registered users, instead identifying the other attendees by a number or a generic string, for example. As another example, the monitoring service 110 can provide the non-registered user with only an estimated time of arrive for other attendees, and not provide any indication of the other attendees' location. At a designated time after the one-time event, the monitoring service 110 can delete any information obtained from the non-registered user, including the username the user provided.

For registered users, the monitoring service 110 can maintain a set of data, including a user's status with respect to a calendar event that has been registered with the monitoring service 110 and to which the user has been invited. The monitoring service 110 can obtain the user's status (e.g., whether the user has accepted, declined, or not responded to the invitation to join the calendar event) from parameters provided with the calendar event. Alternatively or additionally, the monitoring service 110 may be able to access a calendar (e.g., a calendar file that is linked to the monitoring service 110) that is updated by a calendar application when invitees accept or decline the event invitation. Alternatively or additionally, the monitoring service 110 may be able to access a calendar feed (e.g., a data stream whose source is another calendar, where the data stream includes calendar data that is being shared from the source calendar to another calendar) that periodically provides new event data and/or updates to existing events. Alternatively or additionally, invitees may be able to accept or decline an event using a software application provided by the monitoring service 110, in which case the monitoring service 110 can obtain the invitee's status from the application.

In various examples, the data the monitoring service 110 maintains for a registered user can further include a contact list of other users registered with the monitoring service 110 and/or a link to a contact list maintained by another application. In some examples, a link to a contact list outside of the monitoring service 110 can be provided so that a registered user can access the external contact list when selecting users to invite to an event. In these examples, users selected from the external contact list who are not registered with the monitoring service 110 will not be tracked, or will need to provide explicit consent to be tracked. For example, the monitoring service 110 may generate an email or other digital message that requires an affirmative response (e.g., clicking of button or link) to indicate consent to be tracked. In various examples, the monitoring service 110 can use contact list maintained by the monitoring service 110 to determine information available to a registered user. For example, when a one registered user adds another registered user to the first user's contact list, a different level of tracking information (with respect to a specific event) may be made available to the first user. For example, the first user may be able to see more detailed tracking information, such as a precise location, for users in the first user's contact list, and see less information for other users, such as only an approximate distance from the event location.

As an alternative or an addition to a contact list, the monitoring service 110 can, for example, maintain a list of "allowed" users and "blocked" users for each registered user, where the users in the list can be registered or unregistered users. In this example, "allowed" users can see at least some tracking information (with respect to a specific event) for the user associated with the lists, and "blocked" users can see no tracking information. In various examples, users who are not registered with the monitoring service 110 can also be blocked. Non-registered users can be identified, for example, by an email address or username or handle with another service, such as a social media service. By allowing blocking of unregistered users, a user need not know whether a user to be blocked is registered with the monitoring service 110.

In various examples, the data that the monitoring service 110 maintains for a registered user can further include the information that is displayed for the user when the user is being tracked. For example, the user may be able to specify a name or other character string by which the user will be identified to other users As another example, the user may be able to specify the level of detail that is displayed to other users. Levels of detail can include, for example, whether the user has accepted or declined to attend to event (e.g., no location or time data), an estimated time of arrival (e.g., no location data), an approximate distance from the event location (e.g., imprecise location data), and/or a precise location. In this example, the approximate distance from the event location and the precise location can also include an estimated time of arrival. In various examples, a registered user can set a level of detail that applies to all events (e.g., a default level of detail). In some examples, the user can set a level of detail for a specific event, for example when the user accepts an invitation to attend the event. In some examples, the owner of the event can control the level of detail for all attendees. In these examples, the owner may not be able to specify a greater level of detail than an attendee has specified.

In various examples, the monitoring service 110 can also maintain, for each registered user, a registered device. Registering a device with the monitoring service 110 indicates to the monitoring service 110 that the device that is registered is the device to be tracked when the user is being tracked. In some examples, a user can register more than one device. In these examples, the user may need to specify, for each calendar event, which device is to be used to obtain tracking information. Alternatively or additionally, the user may be able to designate a "primary" device and additional devices, and the monitoring service 110 will track the primary device unless the user indicates otherwise.

Devices that can be registered for tracking can include various network-enabled computing devices. Examples of network-enabled computing devices include smart phones, tablet computers, personal digital assistants, laptop computers, and other devices that include an integrated circuit for executing computer code, memory, and a network interface. Computing devices can further include devices such as desktop computers and server computers when these computing devices are capable of being mobile. The network interface of a network-enabled computing device can include an antenna for communicating with Wi-Fi networks and/or cellular networks. In some examples, a computing device can further include location capability, that is, the ability to determine or indicate the device's geographic location. For example, the computing device can include a GPS receiver and/or software for determining the device's location using nearby cell towers.

In various examples, when the start time of a registered calendar event is approaching, the monitoring service 110 can determine which users to track, or, more specifically, which devices to track. As noted above, in various examples, only users registered with the monitoring service 110, or who have given temporary permission to be tracked, will be tracked. Additionally, in some examples, only users who have indicated an intention to attend the event will be tracked. In some cases, a registered user may have indicated an intention to attend the event, but may have requested that the monitoring service 110 not track the user for this event, in which case the user will not be tracked.

In various examples, the monitoring service 110 can further determine when to start and stop tracking. Tracking can start, for example, an hour before the start of the event, 30 minutes before, or some other number of minutes before the start of the event. In some examples, the owner of the event can designate when tracking should start, or else the monitoring service 110 can determine the time. In some examples, the monitoring service 110 can stop tracking when the event starts or some number of minutes after the event starts (e.g., 30 minutes or a time designated by the owner of the event). Alternatively or additionally, tracking can stop when all attendees have arrived at the event location. Alternatively or additionally, tracking can continue until the end of the event, which can enable attendees to find each other at or during the event. In some examples, the monitoring service 110 can be configured to start tracking at the start of the event instead of before the event, and stop tracking at certain number of minutes after the start of the event, at the end of the event, or a certain number of minutes after the end of the event.

In some examples, an attendee user can designate when the user can be tracked. For example, monitoring service's default configuration may be to start tracking 30 minutes before the event, and the attendee user can indicate that the user will only be tracked for 10 minutes before the event. In this example, all other attendee users will be tracked starting 30 minutes before the event.

Once tracking starts, attendee users may be able to see each other's tracking data using, for example, a software application provided by the monitoring service 110 that can execute on the users' devices. In various examples, the monitoring service 110 can determine the tracking data that each user is able to see. For example, the default configuration for the monitoring service 110 can be to show all attendee users only an estimated time of arrival for other attendee users. Alternatively or additionally, the monitoring service 110 can be configured to show an approximate distance of each attendee user from the event location 102. Alternatively or additionally, the monitoring service 110 can be configured to show each attendee user's approximate geographic location, for example on a map. In some examples, the monitoring service 110 can additionally show each user's probable route to the event location 102. In some examples, the monitoring service can show a complete or limited history of tracking during an event so that users can determine whether other attendees are moving in the direction of the event location.

In various examples, individual attendee users may show different levels detail in the users' tracking data. For example, one user may enable precise location tracking, so that the user's geolocation is available to other attendee users. As another example, another user may enable display of only the user's distance to the event, without a precise location. As another example, another user may enable only the most limited tracking data, such as an estimated time of arrival, so that the user's geolocation is not provided. In some examples, the owner of the event can specify the degree of tracking data that is available, and attendee users can choose to override this setting with a setting that is specific to each user.

In various examples, when the owner of the calendar event is not an attendee to the event, the owner may still be able to see the attendee users' tracking data. In some examples, the event owner may be able to see a precise geolocation for each user, even though this level of detail is not available for viewing by the attendee users.

In some examples, the owner of the calendar event can designate non-attendee users who can see the attendee users' tracking data. This feature can be used, for example, when the attendees to an event are children and the children's parents, who are not attending the event, want to make sure the children get to the event location 102.

As noted above, the monitoring service 110 determines the tracking data for each attendee user using tracking information that is available from a computing device that is being carried by a person registered as the user. In some examples, the monitoring service 110 can obtain tracking data from users' devices. For example, a computing device may have a GPS receiver and/or may be able to determine a geolocation from nearby Wi-Fi signals or cellular antennas. In various examples, when a user registers a device with the monitoring service 110, registration includes giving the monitoring service 110 access to the geolocation data the device is able to determine about itself. Using the geolocation data, the monitoring service 110 can determine where a device is during the tracking period, and from the device's location determine tracking data for the device. The monitoring service 110 can then provide the tracking data, at various levels of detail, to those monitoring the arrival of attendees at an event.

Determining accurate and useful tracking data can require more information than knowing where a device is at a given moment. As illustrated in the example of FIG. 1, different attendees may be getting to an event location 102 in different ways. For example, a first device 114 may be being carried by a person who is walking to the event location 102, while a second device 116 is in a car that is being driven to the event location 102. As a further example, a third device 118 may be being carried by a person who is bicycling to the event location 102. In some cases, an attendee's route to the event location 102 may involve multiple legs, which can further complicate determining the attendee's arrival time. For example, in the example of FIG. 1, a fourth device 120 may be being carried be being carried by a person who is on a train, and once the train reaches a train station 122, the person may walk the rest of the way to reach the event location 102.

Because of variations in the ways that attendees may be getting to the event location 102, the monitoring service 110 may need to dynamically calculate a device's expected time of arrival at the event location 102, and may further need to modify or update the device's arrival time as the monitoring service 110 acquires more tracking data. For example, when tracking is first enabled for an event, the monitoring service 110 can monitor a device being tracked for a period of time, to determine the device's location and the device's rate of travel. From this information, the monitoring service 110 may be able to determine information such as whether the person carrying the device is likely walking, in a car, riding a bicycle, on a train, or using another form of transit. The device's location, either at a given instance or over time, can indicate, for example, that the device might be on a train or on a road, and/or the device's rate of travel can indicate a probable mode of travel (e.g., walking, running, bicycling, driving, etc.).

In various examples, once the monitoring service 110 has established a device's mode of travel, the monitoring service 110 can make an initial computation for when the device is expected to reach the event location 102. For example, the device's expected time of arrival can be computed from the device's instantaneous distance from the event location 102 and the device's rate of travel. In some examples, the monitoring service 110 may enable tracking before providing tracking data for viewing (e.g., 15 minutes, 30 minutes, or another interval of time before the tracking data is available), so that the initial expected time of arrival more accurately reflects each attendee's expected time of arrival. Herein, the time a device is tracked that precedes the time when tracking data can be viewed will be referred to as the initial tracking period and the time when tracking data is viewable will be referred to as the primary tracking period.

In various examples, the monitoring service 110 can attempt to provide a more accurate time of arrival for a device. For example, having established a probable mode of travel, the monitoring service 110 can determine a probable route for a device, using mapping data, for example. In this example, the device's estimated time of arrival at the event location 102 can be computed from the distance to be traveled and the rate of travel, among other factors. Route data can also aid the monitoring service 110 in determining that the rate of travel of a device may change, such as in the example of the fourth device 120 that is on a train. In some examples, the monitoring service 110 can further use information such as traffic data, train schedules, current police or other emergency data, and/or weather data to determine whether the person carrying a particular device may be slowed down for any reason, or may have to use a different route.

In various examples, the various devices that are traveling to the event location 102 may be able to view the estimated time of arrival (and possibly the location) of each of the devices of the attendees. In various examples, other devices can also view tracking data for the devices traveling to the event location 102. For example, a stationary device 112, which, in the illustrated example, is at the event location 102, may also be able to see the tracking data. The stationary device 112 may be registered to the owner of the event, a person designated as being able to see tracking data for the event, and/or an attendee to the event.

In various examples, a user of the stationary device 112 (and other devices) may be able to see the tracking data using a software application executing on the device, which is able to obtain data from the monitoring service 110. The software application may show, for example, a list of names or other identifiers for each of the attendee users, and an expected time of arrival for each attendee. For example, the application may show text such as "arriving in 10 minutes" or "arriving at 3:05 pm." As another example, when a device's location is available, the software application may show a map with the device's location marked. In this example, the device's probable route to the event location 102 may also be marked. When a precise geolocation is not enabled, the application may instead show, for example, a circle around the event location 102 that indicates an attendee's approximate distance from the event location 102.

In various examples, a device's rate of travel to the event location 102 may change over the time period that the device is tracked. For example, the person carrying the first device 114 may step into a cab, or the person carrying the second device 116 may park and walk the remainder of the distance. As another example, the train may be delayed, so that the person carrying the fourth device 120 becomes stationary for a period of time or arrives at the train station 122 later than indicated by a train schedule. As another example, an attendee may choose to use a different route from the route determined by the monitoring service 110, and/or may make a stop along the way. For these and other reasons, the monitoring service 110 can periodically update the tracking data for each of the attendee users. For example, the monitoring service 110 can reacquire a device's location every 30 seconds, 60 seconds, 5 minutes, or over another interval of time, and can recompute a device's expected time of arrival. In some examples, the updated tracking data is pushed to devices, such as the stationary device 112, so that the user of the device is notified that the updated information is available. Alternatively, if the user is actively viewing the data on the stationary device 112, the user can then be provided with updated information as soon as the data is available. In some examples, the updated tracking data is only pulled from the monitoring service 110 when a user opens the software application on a device.

As noted above, it is assumed that a person attending an event will be carrying a computing device that the person has registered with the monitoring service 110 for tracking. In some cases, however, the person may have left the device at home or at another location, in which case the person cannot be tracked. In these cases, the monitoring service 110 may be able to determine tracking data is not available for the person, and can so indicate to other attendees. The monitoring service 110 may be able to determine that the device is not being carried by the person, for example, by determining that the device has been stationary for a certain amount of time during the initial tracking period and/or the primary tracking period. Alternatively or additionally, in some examples, the monitoring service 110 may allow users to set a "home" location, a "work" location, or other locations, which the monitoring service 110 can use to determine where the users' devices are located. In these examples, when the monitoring service 110 determines that a device is at, for example, a "home" location and has not moved for a period of time during the initial tracking period and/or the primary tracking period, the monitoring service 110 can determine that the person associated with the device may not be carrying the device.

Alternatively or additionally, in some examples, when an attendee's device has been stationary for a period of time, or if the device's location during the initial tracking period or the primary tracking period indicates that the device is moving away from the event location 102, the monitoring service 110 may determine that the person associated with the device may not be going to the event. In these examples, the monitoring service 110 can relay information such as "may not be attending" or "may not be carrying device" in the tracking data for this person. In some examples, the monitoring service 110 may push a reminder to the potentially non-attending user to request further information from the user. In these examples, the user could send a quick reply such as "not attending" or "delayed but coming" among other messages. Such information could then be displayed to others attending the event. In various examples, the monitoring service 110 can attempt to determine whether the potentially non-attending user has viewed the reminder notification. For example, the reminder can be pushed to a software application executing on the user's computing device, such that, when the user taps on or otherwise selects the reminder, the software application receives a notification, which the application can send to the monitoring service. Alternatively or additionally, the reminder can appear in a notifications list provided by the computing device's operating system, and when the user "swipes" or otherwise removes the reminder from the notifications list, the software application can receive a notification from the operating system. In these and other examples, determining whether a user responds to a reminder can further aid the monitoring service in determining whether the person is not in possession of the computing device.

In various examples, the software application provided by the monitoring service 110 can provide an interface that can enable users to send messages only to invitees to an event, and/or only to attendees to the event. This interface can enable users to provide updates about the event or about themselves, such as indicating a late or early arrival, a decision not to attend, or other information. In some examples, the interface can provide short messages that only require one action (e.g., activating a user interface element by clicking or tapping the element) to be sent. Such messages can include, for example, "running late," "be there in five minutes," "I'm on my way," "stuck in traffic," or similar messages. In various examples, the application can enable users to program custom messages. In some examples, a group chat can automatically be generated for each event. A group chat, which can also be referred to as a chat room, would allow users to share text messages, emojis, gifs, images, videos, or other electronic communications, among other examples. In some examples, the monitoring service can be configured to purge communications generated in the event-specific chat when data for the event is purged.

In some examples, the monitoring service 110 may alternatively or additionally receive tracking information from a data service. The data service may be able to obtain geolocation data from user devices, as well as other data. The data service may provide an Application Programming Interface (API) through which an online service such as the monitoring service 110 can obtain the data. To obtain the data, the monitoring service 110 may need information such as a user identifier, a device's Media Access Control (MAC) address, International Mobile Equipment Identity (IMEI), Electronic Serial Number (ESN), Mobile Equipment Identifier (MEID), and/or an authentication token authorizing the monitoring service 110 to obtain the data on a user's behalf. The data that may be available from the data service can include, for example, a device's location, a device's distance from an event location 102, a device's rate of travel, a device's route when the device is being used to navigate to the event location 102, the manner in which the device is traveling (e.g., by train, by car, by bicycle, on foot, etc., which may be obtained from the navigation data), whether the device is "at home," "at work," or at another location designated by a user, and/or other data that can be used by the monitoring service 110 to determine when or if the device will arrive at the event location 102.

As noted above, the monitoring service 110 intends to provide tracking of computing devices only in relation to a particular event. Thus, at a specified time after the start or end of the event, the monitoring service 110 will delete the tracking data obtained for each device. The tracking data will no longer be relevant, and deletion of the data satisfies privacy and security concerns that any of the attendees to the event may have.

Figure 2:
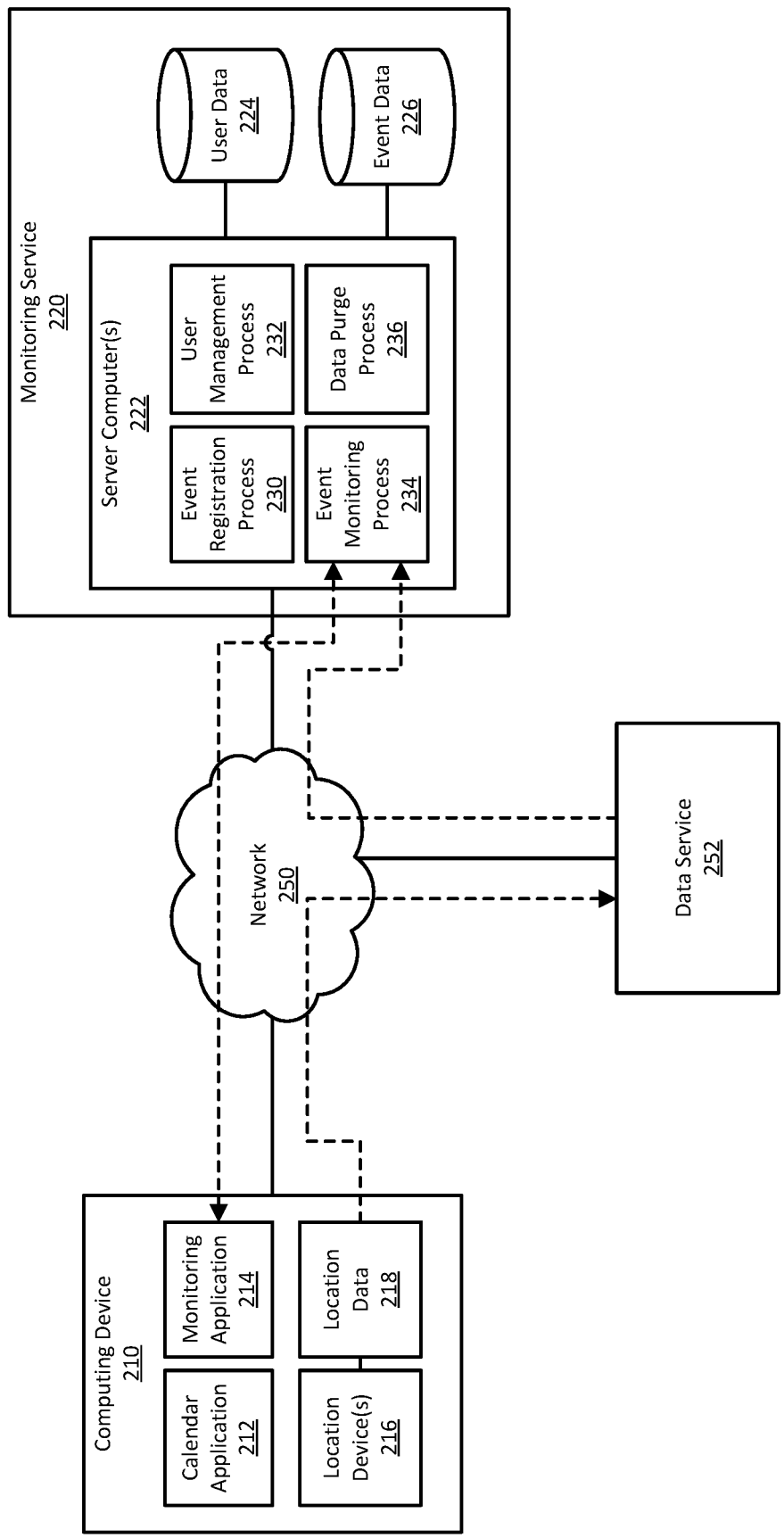
FIG. 2 is a diagram illustrating an example of an event monitoring.

FIG. 2 is a diagram illustrating an example of an event monitoring system 200. In various examples, the event monitoring system 200 includes a monitoring service 220 that enables tracking of computing devices, such as the computing device 210 illustrated in the example. In various examples, the monitoring service 220 can communicate with the computing device 210 over a network 250, which can include private networks and/or public networks such as the Internet. In some examples, the monitoring service 220 can optionally communicate over the network 250 with a data service 252 that can provide data about the computing device 210.

The computing device 210 of this example can include various types of electronic devices that include a microprocessor capable of executing instructions of computing code, memory for storing the instructions and/or other data, and network capability, such as a wired or wireless network card and/or a cellular antenna. Examples of such electronic devices include laptop computers, desktop computers, tablet computers, smart phones, personal digital assistants, smart watches, digital eyeglass systems, computing systems mounted into cars and other vehicles, and others.

In various examples, the computing device 210 can include hardware and software that enable the computing device 210 to interact with the monitoring service 220 and to be tracked. For example, the computing device 210 can include a calendar application 212 through which a user can generate calendar events and a monitoring application 214 that interfaces with the monitoring service 220. The computing device 210 can also include one or more location devices 216 that can determine the computing device's location, and that produce location data 218.

The calendar application 212 can be a standalone application, such as Google Calendar or Apple Calendar, and/or can be integrated into another application, such as Outlook or a mobile application. Alternatively, the calendar application 212 can be a web-based calendar that is accessible through a web browser. In various examples, multiple calendar applications may be available on the computing device 210. In some examples, the calendar application 212 can aggregate calendar data from different calendar applications into the same interface. In some examples, the calendar application 212 can receive calendar data form a calendar feed; that is, an interface through which calendar information from other calendars can be provided to the calendar application 212. In these examples, the other calendars can be, for example, the calendars of users other than the user of the computing device 210.

Using the calendar application 212, a user can set up a new calendar event, including inviting users to join the event. The calendar event can be, for example a work-related meeting, a family gathering, a party, a dinner, a meeting for coffee, a concert, and so on. In some examples, the calendar event can be recurring, such as a monthly meeting or weekly soccer practice. In some examples, the invitees to an event may be generally the same for each recurrence of the event, such as when the event is a book club meeting. In some examples, an event may be part of a series of events where the approximately the same people will be attending each time. For example, the series of events can be practice and/or games for a sports team.

The monitoring application 214 can enable a user to register calendar events with the monitoring service 220 and/or to view tracking data when tracking is enabled for an event. In some examples, the monitoring application 214 can be linked to the calendar application 212, so that when the user generates a new calendar event in the calendar application 212, the monitoring application 214 can detect the new event. To detect the new event, the monitoring application 214 can, for example, have a background process or callback that detects when a calendar file is updated on the computing device 210 and/or when calendar data is uploaded from the computing device 210 to a network location for storing the calendar data. In some examples, the user can link specific calendars to the monitoring application 214, so that any event added to the linked calendar is registered for monitoring. In some examples, the monitoring application 214 may ask the user whether the user wants to register an event for monitoring each time the monitoring application 214 detects a new event.

In various examples, the monitoring application 214 and/or the calendar application 212 can send calendar event data to the monitoring service 220 to register the event for monitoring. In various examples, the monitoring service 220 can be implemented using various software processes executing on or more server computers 222. The software processes can include, for example, an event generation process 230, an user management process 232, an event monitoring process 234, and a data purge process 236, among others. The monitoring service 220 can further include one or more data stores to store data such as user data 224 and event data 226, among other data. The data stores can be implemented using, for example, hard drives, solid state drives, or another form of non-volatile storage memory.

The server computers 222 on which the processes execute can be computing devices that include one or more processors capable of executing program instructions and memory for storing the program instructions. The server computers 222 and the data stores can, for example, be housed in a data center and/or provided as a service from a data center.

The event generation process 230 can register new events for monitoring. For example, when the monitoring service 220 receives data about a calendar event, the monitoring service 220 can determine the parameters of the event, including the date, start time, the location, and/or the users invited to join the event, among other parameters. In various examples, the event generation process 230 can store the parameters of the calendar event in the data store for the event data 226. As discussed further below, the event generation process 230 can receive data about a calendar event in different ways, such as by email, in a data packet from the monitoring application 214, and/or using an API to a calendar service or a calendar feed, among other methods.

The user management process 232 can manage the user data 224, including determining whether a user invited to join an event is registered with the monitoring service 220, sending invitations when a user is not already registered, associating registered users with the users listed as invited to join a calendar event, and/or maintaining the status of invitee users (e.g., whether a user has accepted, declined, or not responded). In various examples, the user management process 232 can receive a list of invitee users from the event generation process 230. The list may include, for example, user identifiers, email addresses, social media handles, or some other form of identification for the invitee users. In these and other examples, the user management process 232 can search the user data 224 to match the user identifiers with entries for registered users. The user management process 232 can then associate the registered users with the calendar event, and store the association with the calendar event's data in the data store for the event data 226. In various examples, the user data 224 can also include data identifying each invitee users' registered device or devices, which can also be associated with the calendar event.

The monitoring service 220 can enable the event monitoring process 234 when the monitoring period for a calendar event starts. As noted above, the monitoring period can start a certain number of minutes or hours before the start of the event or at the start of the event. As also noted above, the monitoring period can include an initial monitoring period, during which the event monitoring process 234 determines an initial location and estimated time of arrival of each attendee user's registered device, and during which tracking data for each device is not yet provided. The monitoring period can end at the start of the event, some number of minutes after the start of the event, at the end of the event, some number of minutes after the end of the event, when all attendees arrive, or at some other time that is related to the event. In some examples, monitoring can stop for some or all attendees when each arrives at the event location. In some examples, a combination of factors can determine when the monitoring period ends, such as all of the attendees arriving or else a number of minutes after the start of the event being reached. In some examples, during the monitoring period, a user can indicate "not attending" and monitoring for that user will stop immediately.

During the monitoring period, the event monitoring process 234 can gather data about each device being monitored. For example, the event monitoring process 234 can obtain the location data 218 that is generated by a computing device's location devices 216. The location data 218 can include the computing device 210 location at a given moment, and by obtaining the location data 218 at intervals of time, the event monitoring process 234 can determine the computing device's rate of movement. From this and other data, the event monitoring process 234 can compute the computing device's estimated time of arrival at an event location.

In some examples, the event monitoring process 234 can obtain tracking information for the computing device 210 from a data service 252. The data service 252 may itself obtain location data 218 from the computing device 210 for various reasons, such as to provide navigation data (e.g., directions to an event), to provide location based services such as weather or news, or for other reasons. In various examples, the data service 252 can provide the location data 218 to other services, such as the monitoring service 220. In most cases the data service 252 only provides the location data 218 when a user associated with the data has provided authorization for a services such as the monitoring service 220 to receive the data.

When the event monitoring process 234 receives tracking information from the data service 252, in some examples, the event monitoring process 234 can determine the computing device 210 location and estimated time of arrival. In some examples, the data service 252 can provide additional data, such as route information, traffic information, train schedules, and other data, that can make the tracking data for the computing device 210 more accurate. In some examples, the data service 252 can itself provide an estimated time when the computing device 210 will reach an event location. In some examples, external services such as those provided by Google Maps Platform can be called on to request a user's estimated time of arrival, routing, or other geolocation data.

In various examples, the event monitoring process 234 can output the computing device's location and/or estimated time of arrival for viewing using the computing device 210 and the devices of other users that have been granted access to the data. The monitoring application 214, for example, can include a user interface that can display a location and/or estimated time of arrival. In some examples, the event monitoring process 234 pushes this tracking data to the monitoring application 214, so that the monitoring application 214 can indicate that the monitoring period is active and that updated tracking information is available. In some examples, the monitoring application 214 pulls the tracking data from the event monitoring process 234 whenever the monitoring application 214 is launched.

In various examples, during the monitoring period, the monitoring application 214 can also enable other data to be available. For example, a chat session may be available, through which attendee users can send messages to one another. In some examples, chat or instant messaging for invitee and attendee users can also be available before the monitoring period, so that users can discuss the event. As another example, during the monitoring period, the monitoring application 214 can enable a menu of quick messages that can be sent with one click or tap, for situations where a user needs to provide an update about the user's status (e.g., running late) and is not free to type a message.

The monitoring service 220 can enable the data purge process 236 at the end of the monitoring period, or at a certain time thereafter. The data purge process 236 can delete from the event data 226 all data related to a specific event, including the parameters of the event, any communications generated through a group chat initiated for the event, and any tracking data obtaining during the monitoring period for the event. No history of events or tracking data is kept by the monitoring service 220, because it is assumed that this data is no longer needed once an event is over. Purging the data can also satisfy safety, security, and privacy concerns of the people using the monitoring service 220.

Figure 3:
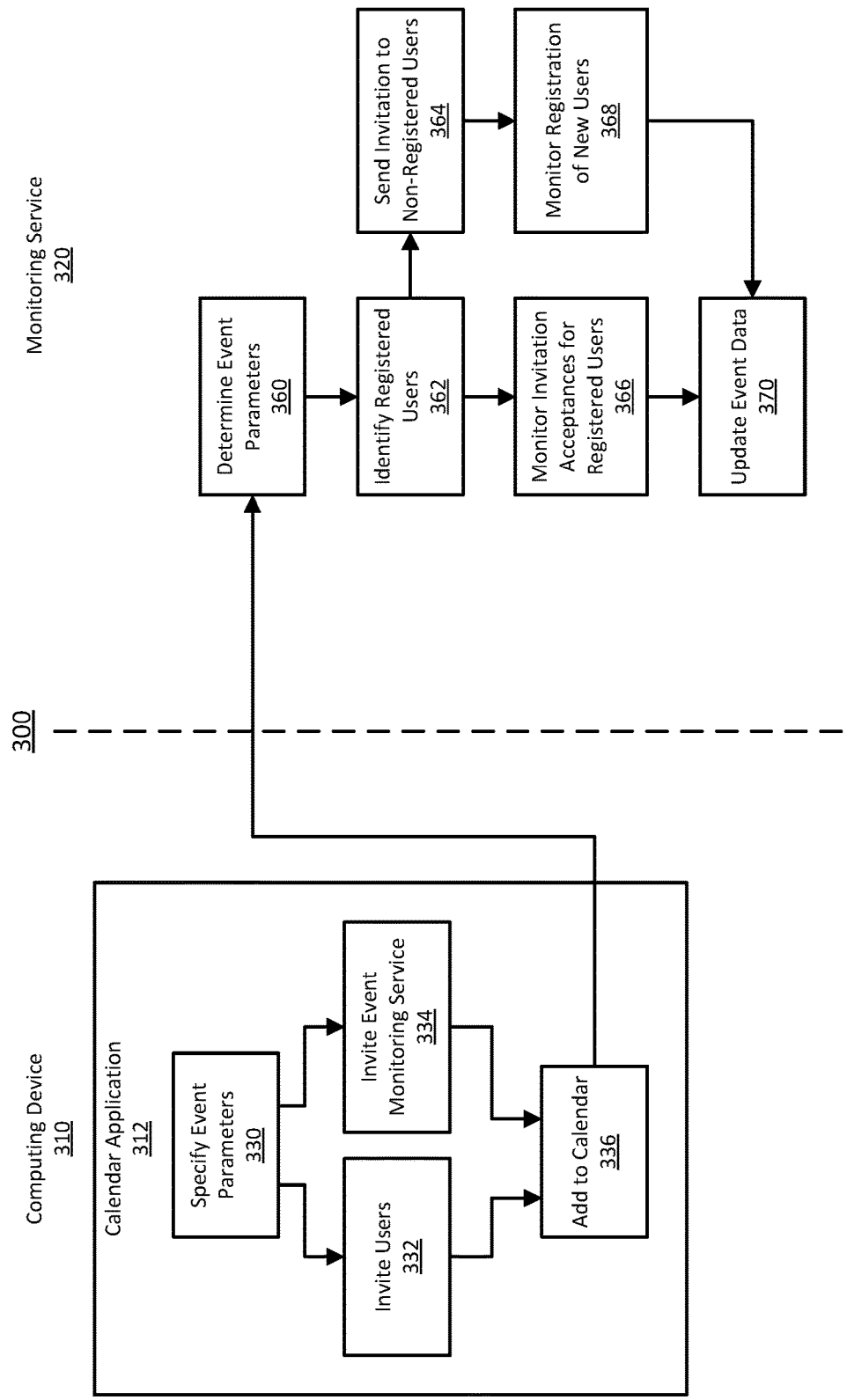
FIG. 3 is a diagram illustrating an example of a process for registering a calendar event with a monitoring service.

FIG. 3 is a diagram illustrating an example of a process 300 for registering a calendar event with a monitoring service 320. The example process 300 can include steps performed by a computing device 310, such as a smartphone, a tablet computer, or another portable electronic device, and a monitoring service 320, such as the monitoring service illustrated in FIG. 2.

In the example of FIG. 3, a calendar event is generated using a calendar application 312 executing on a user's computing device 310. Using the calendar application 312, the user can, at step 330, specify parameters of the event. The parameters can include, for example a date or dates for the event, a start time, an end time, and/or a location for the event, among other parameters. The user generating the calendar event may be considered the owner of the event; that is, a user with the ability to change the event, invite other users, monitor invitation acceptances and rejections, and/or take other actions that invitee users may not be able to take. In some cases, another user may be the owner, and/or there may be multiple owners. Having obtained the event parameters, the monitoring service 320 can store the parameters in an event data database.

At step 332, the user can invite other users to join the event. The calendar application 312 can enable the owner user to, for example, specify email addresses for the other users, to select user identifiers or names from a list, and/or to search for users. In some examples, the calendar application 312 can enable the owner user to invite another user by specifying the invited user's email address. In some examples, the calendar application 312 may limit the users who can be invited. For example, the owner user may only be allowed to invite users from within the user's contacts list or own organization.

At step 334, in addition to inviting users to join the event, the owner user can also invite the monitoring service 320 to join the event. The monitoring service 320 can be invited, for example, using an email address that is provided by the monitoring service 320 for this purpose. In this example, the monitoring service 320 can be added as an invitee in the same manner as users who are invited to join the event. As an invitee, the monitoring service 320 can also receive updates or changes to the event. For example, when a change is made to the event the calendar application 312 can send notifications to each of the invitee users, including the monitoring service 320.

At step 336, the user can add the event to the user's calendar, which causes the event to be generated and data for the event to be stored in a calendar file or elsewhere. At step 336, the calendar application 312 may also send a notification of the calendar event to each of the invitees added at step 332 and step 334. The notification can include a link or graphical user element that enables an invitee user to respond to the invitation in the affirmative or in the negative. In some examples, when an invitee user activates a link or button, the invitee user's own computing device can send an email back to the owner user to indicate acceptance, rejection, or possibly a "tentative" or "maybe" status. In some examples, an invitee user's response may be hidden from the owner user, and may be received by the calendar application 312, which can maintain each invitee user's status. In some examples, when an invitee user activates a link or button from the notification, the invitee user may be taken to a calendar application executing on the invitee user's own computing device or to a web site, where the invitee user can indicate acceptance, rejection, or an uncertain status.

In various examples, a notification inviting users to join the calendar event is also received by the monitoring service 320. At step 360, the monitoring service 320 can use the notification to determine the event parameters. Step 360 can be performed, for example, by an event generation process executing on a server computer. In some cases, the notification includes the event parameters, for the convenience of the invitee users. In cases where the notification requires activating a link or graphical element to obtain the event parameters, the monitoring service 320 can include automated processes or "bots" that can activate the link or graphical element to activate the application or website from which the monitoring service 320 can obtain the event parameters.

In various examples, the event notification can also include a list of other users invited to attend the event. At step 362, the monitoring service 320 can determine which of the other invitees are members of the monitoring service 320 and which are not. Step 362 can be performed, for example, by a user management process executing on a server computer. The user management process can, for example, match user identifiers in the notification against user identifiers for registered users, which are stored in a user database.

For invitee users who are not found in the user database, at step 364, the monitoring service 320 can send an invitation to join the monitoring service 320 to these non-registered users. Step 364 can be performed, for example, by the user management process. In various examples, the monitoring service 320 may require registration because registering with the monitoring service 320 indicates consent to be tracked. The invitation to join can be in the form of an email, a text message, an instant message, or another form of electronic communication.

In some examples, at step 360 the monitoring service 320 may determine that no users have been invited to the calendar event. In these examples, the monitoring service 320 may determine to not register the calendar event, since the owner/administrator of the event is not likely to find it necessary to monitor only the owner/administrator's own location. In these examples, the monitoring service 320 may exit the process 300 after step 360.

At step 368, the monitoring service 320 can monitor registration by new users. Step 368 can be performed, for example, by the user management process. New users can register, for example, by responding to the invitation sent by the monitoring service 320, by downloading the monitoring service's application onto a computing device and configuring a user identifier with the application, through website provided by the monitoring service 320, or through another method. In some examples, when a user registers with the monitoring service 320 in connection with a particular calendar event, the user can, at the same time, consent to being tracked in relation to the event. In some examples, the user can separately indicate consent to be tracked in relation to the event.

At step 366, the monitoring service 320 can monitor invitation acceptances for registered users. Step 366 can be performed, for example, by the event generation process. In some examples, the monitoring service 320 can send the registered invitee users a notification that is separate from the calendar notification, which requests the invitee user to indicate whether the invitees want to be tracked and/or want access to the tracking data of other users. In some examples, the monitoring service 320 can be configured to require invitee users to accept being tracked. In some examples, the monitoring service 320 can be configured to make access to the tracking data for an event contingent on an invitee user accepting being tracked. In some examples, the monitoring service 320 can be configured so that a registered invitee user who accepts the invitation to join an event will automatically be tracked, and/or will automatically have access to the tracking data for the event.

In some examples, step 366 can include receiving updated information about the calendar event from the calendar application 312. The updated information can include invitee users' acceptance and rejection statuses, as well as updated parameters for the event. In some examples, at step 366 the monitoring service 320 may query the calendar application 312 for updated information, for example through an API provided by the calendar application 312.

At step 370, the monitoring service 320 can update the event data for a calendar event with the results of step 366 and step 368. Step 370 can be performed, for example, by the event generation process or an event monitoring process executing on a server computer. Updating the event data can include reading the event data from an event data database and writing updated to the event data database. The updated data can include updated statuses for invitee users (e.g., whether a user has accepted or declined to join the event), changes to which users have been invited, changes to the event time, date, and/or location, and other changes.

Figure 4:
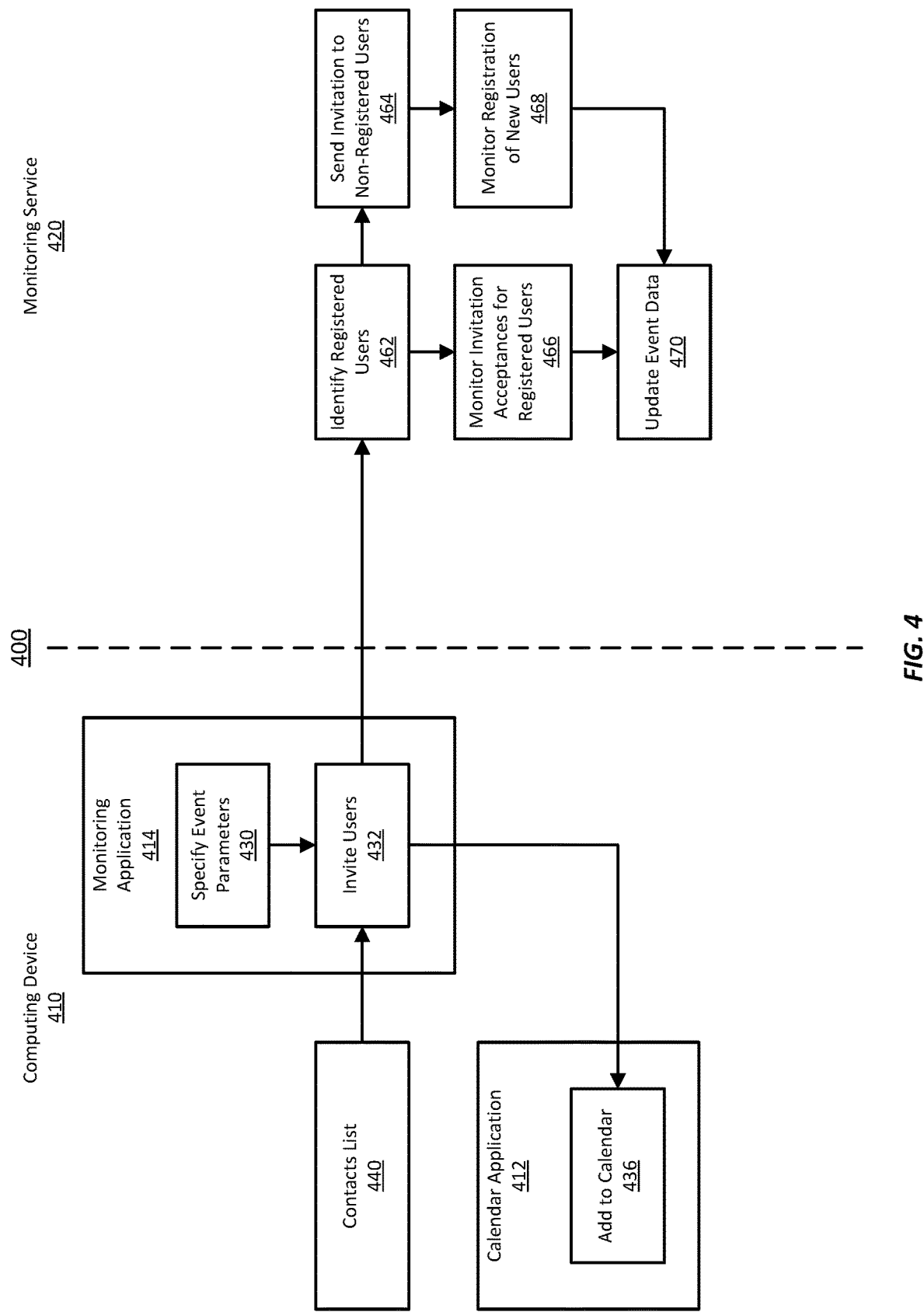
FIG. 4 is a diagram illustrating another example process for registering an event with a monitoring service.

FIG. 4 is a diagram illustrating another example process 400 for registering an event with a monitoring service 420. The example process 400 can include steps performed at a computer device 410, which can be a portable electronic device, and at a monitoring service 420, such as the monitoring service illustrated in FIG. 2.

In the example of FIG. 4, the event is generated using a monitoring application 414 that is executing on a user's computing device 410. The monitoring application 414 can be provided by the monitoring service 420, as an interface to the monitoring service 420. The monitoring application 414 may have functionality for generating calendar events that is similar to the functionality of a calendar application, including displaying a calendar for selecting the date of the event, displaying a map for determining the event's location, being able to select a start and end time for the event, and so on.

In addition to enabling a user, at step 430, to specify the event's parameters, the monitoring application 414 can enable the owner user to, at step 432, invite users to join the event. In some examples, the monitoring application 414 can be linked to a contacts list 440 that is available on the computing device 410. In these examples, the owner user can access the contacts list 440 to identify users to invite. In some examples, the monitoring application 414 can, additionally or alternatively, maintain a separate contacts list, which identifies users that are registered with the monitoring service 420. In some examples, the monitoring service 420 can identify users in the owner user's contact list that are registered with the monitoring service 420, and can augment the contacts list 440 by indicating a user's registration status.

Once the owner user has specified users to invite, the owner user can, at step 436, add the new calendar event to a calendar. In various examples, the monitoring application 414 can communicate the calendar event to a calendar application 412, which can add the event to a calendar maintained by the calendar application 412. In these examples, the event can be added to an existing calendar. In some examples, because the event was added to the calendar through the monitoring application 414, the event will be monitored, while events that were not added to through the monitoring application 414 will not be monitored. In various examples, when the event is added to the user's calendar, the monitoring application 414 or the calendar application 412 can send notifications to the invitee users to inform these users about the event, and request a reply to the invitation to join the event.

When the event is added to the owner user's calendar through the monitoring application 414, the monitoring application 414 can also send information about the event to the monitoring service 420. The information can include the parameters of the event and a list of users who have been invited to the event. At step 462, the monitoring service 420 can identify invited users who have previously registered with the monitoring service 420 For invitee users who have not previously registered, at step 464 the monitoring service 420 can send these users an invitation to register with the monitoring service 420. At step 468, the monitoring service 420 can monitor responses to the invitation to register, and can register new users, and possibly also receive an indication from the new users as to whether these users are going to join the event.

At step 466, the monitoring service 420 can monitor invitation acceptances from registered users. In some examples, invitee users can accept, decline, or indicate a "tentative" or "maybe" status through the calendar application 412, which can transmit this information to the monitoring service 420. In some examples, the invitee users can indicate a status through email, text message, instant message, or some other form of digital communication. The invitee user's status can be received by the calendar application 412 when the invitee user received a notification from the calendar application 412, or by the monitoring application 414 when the invitee user received a notification from the monitoring application 414. When the reply is received at the calendar application 412, the monitoring application 414 may be able to obtain the reply, for example, by querying the calendar application 412 using an API provided by the calendar application 412. Alternatively or additionally, the owner user's calendar may be linked to the monitoring application 414, so that the monitoring application 414 can detect any changes to the calendar file that stores the calendar's data.

At step 470, the monitoring service 420 can update the event data with information obtained at step 466 and 468. In various examples, the monitoring service 420 can update the event data each time the monitoring service 420 receives an update about the event. In some examples, the monitoring service 420 can periodically check whether any updated information is available for the event, for example by querying the monitoring application 414 or instructing the monitoring application 414 to query to the calendar application 412.

Figure 5:
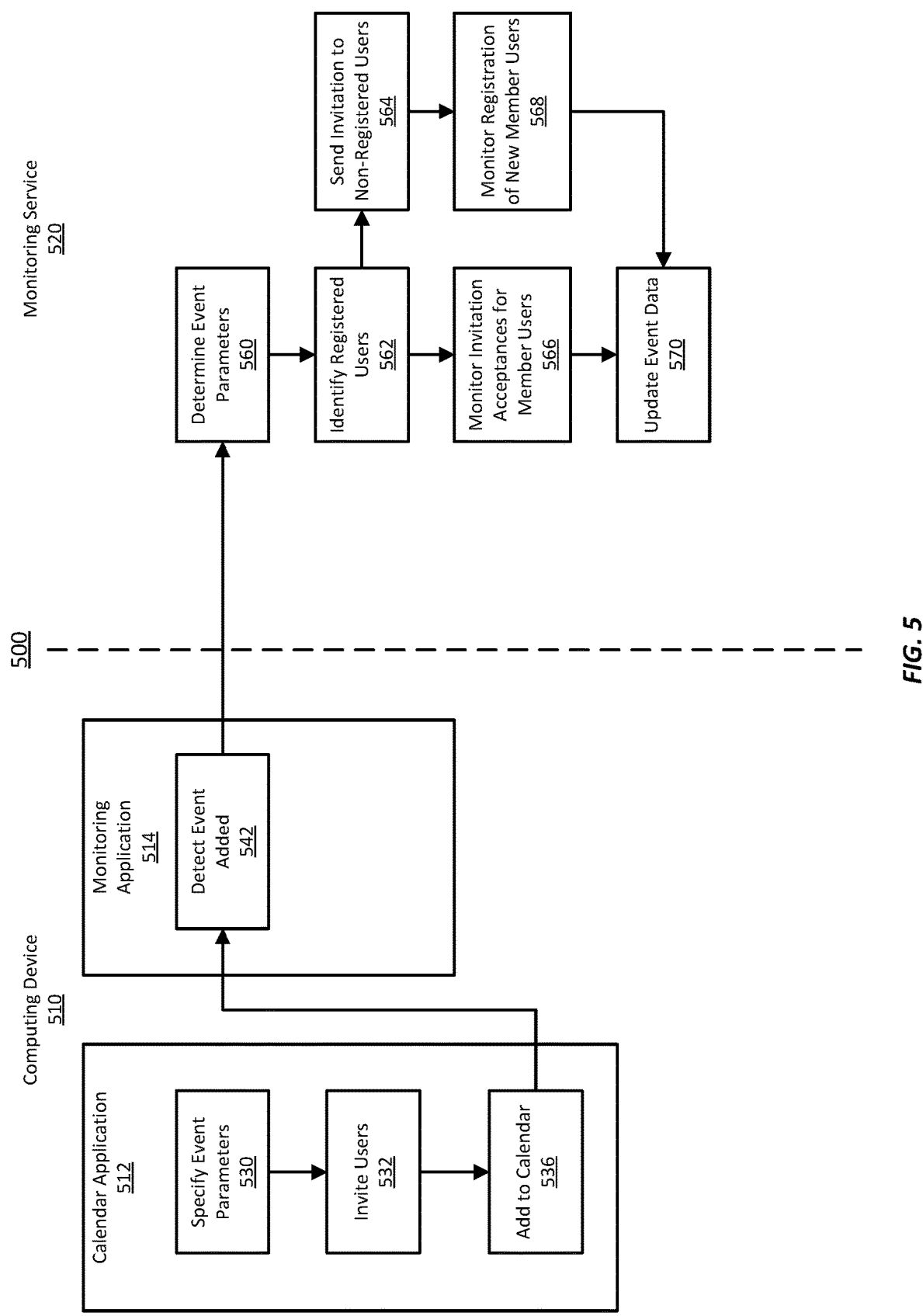
FIG. 5 is a diagram illustrating another example process for registering a calendar event with a monitoring service.

FIG. 5 is a diagram illustrating another example process 500 for registering a calendar event with a monitoring service 520. The example process 500 can include steps performed at a computing device 510, which can be a portable electronic device, and at a monitoring service 520, such as the monitoring service illustrated in FIG. 2.

In example of FIG. 5, a user can, at step 530, specify the event parameters for an event using a calendar application 512 that is executing on a computing device 510. At step 532, the user can also invite users to join the event through the calendar application 512. In this example, the calendar to which the event is added can be linked to a monitoring application 514, so that, when, at step 536, the user adds the event to the user's calendar, the monitoring application 514 is notified.

"Linking" or associating a calendar with the monitoring application 514 means that the monitoring application 514 can read the data for the calendar, which may be stored in structured format in a file or may be available from a calendar feed, and/or can detect when data for the calendar is changed. In some examples, the calendar application 512 can push new or modified calendar data to the monitoring application 514. In some examples, the monitoring application 514 can have a callback function that triggers whenever the calendar file is modified. In some examples, the monitoring application 514 periodically checks the calendar file to see if the calendar file has been modified. In these examples, the monitoring application 514 can, for example, check the calendar file's modification time to determine whether the calendar application 512 has changed the calendar file.

At step 542, the monitoring application 514 can detect that an event has been added to the owner user's calendar, and can send information about the event to the monitoring service 520. At step 560, the monitoring service 520 can determine the event parameters, including the event's date, start time, end time, location, and/or a list of users identified to join the event. At step 562, the monitoring service 520 can identify invited users who have previously registered with the monitoring service 520 For invitee users who have not previously registered, at step 564 the monitoring service 520 can send these users an invitation to register with the monitoring service 520. At step 568, the monitoring service 520 can monitor responses to the invitation to register, and can register new users, and possibly also receive an indication from the new users as to whether these users are going to join the event.

At step 566, the monitoring service 520 can monitor invitation acceptances from registered users. In some examples, the monitoring application 514 can detect changes to the linked calendar. In these examples, the monitoring application 514 can determine what the changes were, and can send these changes to the monitoring service 520. The changes can include, for example, changes to the date or time of the event, changes to the location, changes to the list of invited users, and/or responses from invited users, among other changes.

At step 570, the monitoring service 520 can update the event data with information obtained at step 566 and 568.

Figure 6:
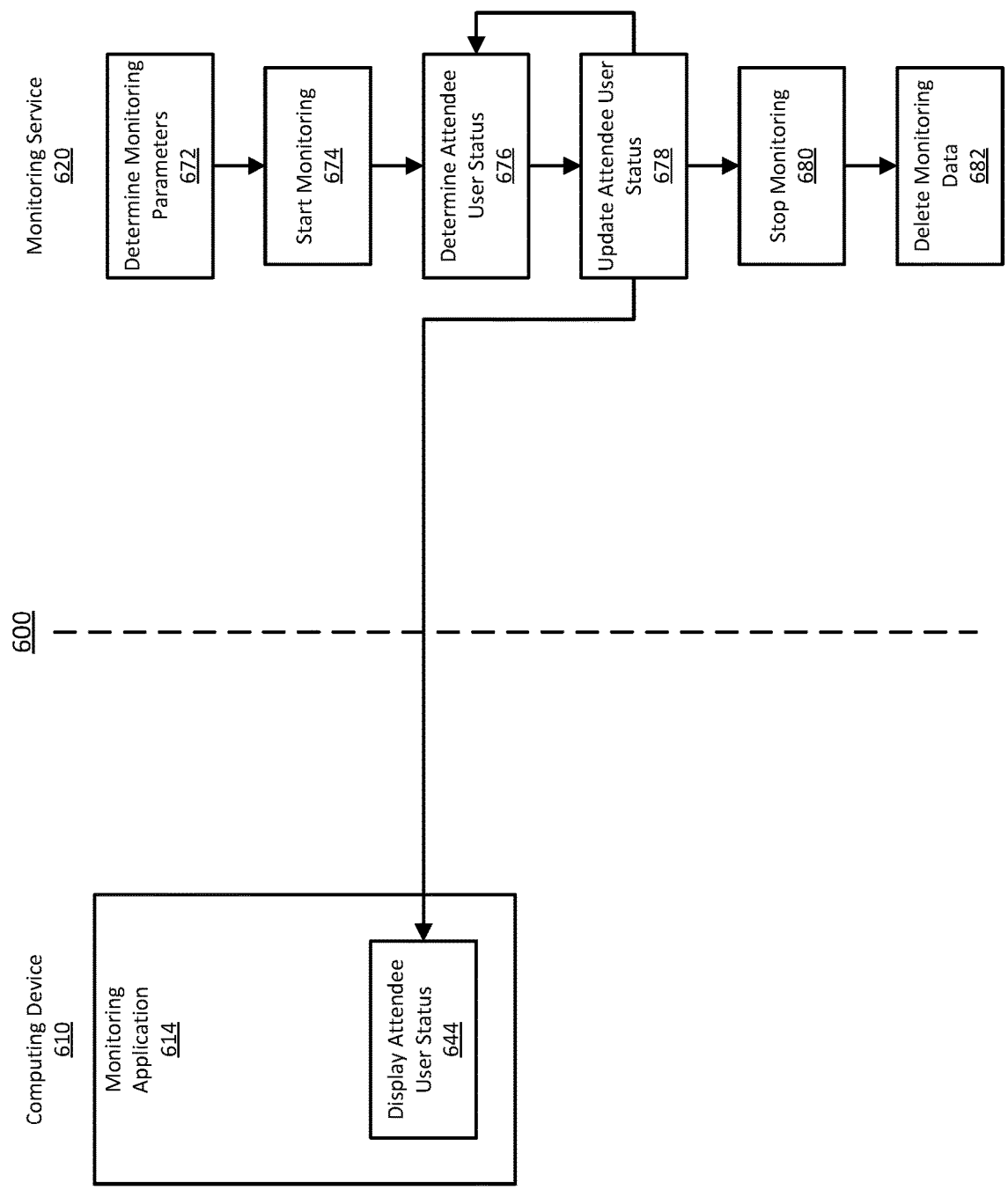
FIG. 6 is a diagram illustrating an example process for a monitoring service can perform when monitoring a calendar event.

FIG. 6 is a diagram illustrating an example process 600 a monitoring service 620 can perform when monitoring a calendar event. The example process 600 can be performed by a monitoring service 620, such as the monitoring service illustrated in FIG. 2, and can involve, as illustrated in FIG. 6, data being transmitted to a computing device 610.

At step 672, the monitoring service 620 can determine the monitoring parameters for the calendar event. The monitoring parameters can include a listing of the devices that are to be tracked, the devices to which the tracking data is available, and the monitoring period. The devices to be tracked can be determined from a list of users that were invited to join the calendar event. For example, the monitoring service 620 can determine which users accepted the invitation to join, and for these users, add devices associated with the users to a list of devices to track. The devices to which tracking data is available can include some or all of the devices that are to be tracked. In some cases, fewer than all the devices that are tracked can receive the tracking data, for example because some users have restricted visibility of the tracking data for their devices.

The monitoring period is the time over which the monitoring service 620 tracks the devices that are to be tracked and/or provides access to the tracking data. In some examples, the monitoring service 620 determines the monitoring parameters when the event is registered. Alternatively or additionally, the monitoring service 620 may determine one or more of the monitoring parameters at a point in time between when the event is registered and when the event is near to starting, such as a day before the start of the event or two hours before the start of the event. For example, the monitoring service may determine the monitoring period start time and end time, and close to the start time (e.g., a half hour before, fifteen minutes before, or some other interval of time beforehand) determine the devices that are to be tracked. In some examples, the monitoring service 620 can continue to update the devices to be tracked and/or the devices that can receive the tracking data once the monitoring period has started. For example, the monitoring service 620 can determine that a user's status has changed from "invited" to "accepted" within the monitoring period, and can subsequently add the user's device to the list of devices being tracked.

In some examples, the monitoring period can also include an initial monitoring period, during which the monitoring service 620 begins tracking devices, but does not yet make the tracking data available. During the initial monitoring period, the monitoring service 620 can establish a location for each device being tracked, and can make an initial calculation of each device's estimated time of arrival. The estimated time of arrival can be made more accurate, for example, by using a device's location information over the initial monitoring period to determine the device's direction of travel, mode of travel, and/or rate of travel, among other time-based information. Before this information is collected, the monitoring service 620 may only have the device's instantaneous location, and thus may only be able to determine a very rough estimate of the device's time of arrival. Additionally, the event parameters and/or display preferences associated with the device may not allow for the device's instantaneous location to be visible. In some examples, a device's location data may include, at the time tracking data is obtained for the device, information such as the device's direction of travel, mode of travel, and/or rate of travel, in which case the initial monitoring period may not be needed.

At step 674, the monitoring service 620 can determine that the start of the monitoring period has been reached, and can start monitoring. In various examples, the start of the monitoring period is relative to the start of the event, such as a certain number of minutes before the event, at the start of the event, or a certain number of minutes after the start of the event.

Once the monitoring service 620 has enabled monitoring, then, at step 676, the monitoring service 620 can determine a status for each attendee user for the event. Determining an attendee user's status can include, for example, determining the location of the user's device, determining the device's location relative to the event location, determining the device's rate of travel, and any other information that can be used to estimate when the device will arrive at the event location. In some examples, the monitoring service 620 can obtain location information from the user's device. In some examples, the monitoring service 620 can obtain location information and/or other information about the user's device from a data service.

Once the monitoring service 620 has obtained tracking information for a user's device, the monitoring service 620 can determine an estimated time at which the device will arrive at the event location. At step 678, the monitoring service 620 can update each attendee user's status with the estimated time of arrival. Updating the user's status can also include updating the current location of the user's device and/or the current distance of the user's device from the event location. In some examples, updating the user's status can also include updating the user's route to the event location, where the route can be indicated by the user, can be inferred by the monitoring service 620, and/or can be provided by a data service.

In various examples, the attendee users' status can be displayed, as at step 644, in a monitoring application 614 that users can execute on a computing device 610. In some examples, determining attendee users' status, at step 676, can also include determining the tracking information to display at step 644. For example, an attendee user may have only enabled display of the user's estimated time of arrival at the event location, and may have disabled display of any location information. As another example, the attendee user may have enabled display of the user's distance from the event, but not the attendee user's exact location. As another example, the attendee user may have enabled display of the user's exact location, as provided by the user's device. In some examples, the owner of the event can set the degree of detail of the tracking data that can be viewed the monitoring application 614.

In some examples, once an attendee user has reached the event location, the monitoring service 620 can so determine at step 676, and can display this fact in the monitoring application 614. In some examples, the computing device 610 can stop tracking an attendee user once the user has reached the event location. In some examples, the monitoring service 620 can continue tracking an attendee user, for example if the owner of the event has configured the monitoring service 620 to keep tracking attendee users and/or if the attendee user has requested for tracking to continue.

In various examples, the monitoring service 620 returns to step 676 from step 678 after an interval of time, such as after 30 seconds, after one minute, after five minutes, or after another interval of time. At step 676, the monitoring service 620 can acquire more current tracking information for each attendee user, and can determine an updated status for the attendee users. The monitoring service 620 can then return to step 678 to update the attendee users' status that can be viewed in the monitoring application 614.

In some cases, some of the parameters of the event may be unspecified. For example, the event location may not have been specified when the event was generated, and may not have been added by the time the monitoring period starts. In this example, the monitoring service 620 may, before starting monitoring at step 674, query the owner of the event to ask for an event location. Alternatively or additionally, in some examples the monitoring service 620 can be configured to assume that the location of the owner user's device is the event location. In these examples, the owner user may be moving, such that the assumed event location changes. In these examples, the monitoring service 620 can dynamically update the attendee user's tracking data as the owner user's location changes.

Once the end of the monitoring period has been reached, at step 680 the monitoring service 620 can disable further tracking of the attendee users' devices. The monitoring service 620 can then proceed to step 682, where the monitoring service 620 will delete the monitoring data and possibly also any other data related to the event. For example, the monitoring service 620 can delete the data the monitoring service 620 acquired at step 676 and the result of any computations executed on this data, including attendee user's distance from the event location, route to the event location, and/or estimated or actual time of arrival at the event. As a further example, the monitoring service 620 can delete the event parameters, and remove the event from the monitoring service's event data base. As another example, the monitoring service 620 can delete communications generated by attendee users, for example through an event-specific group chat provided by the monitoring service 620.

Figure 7:
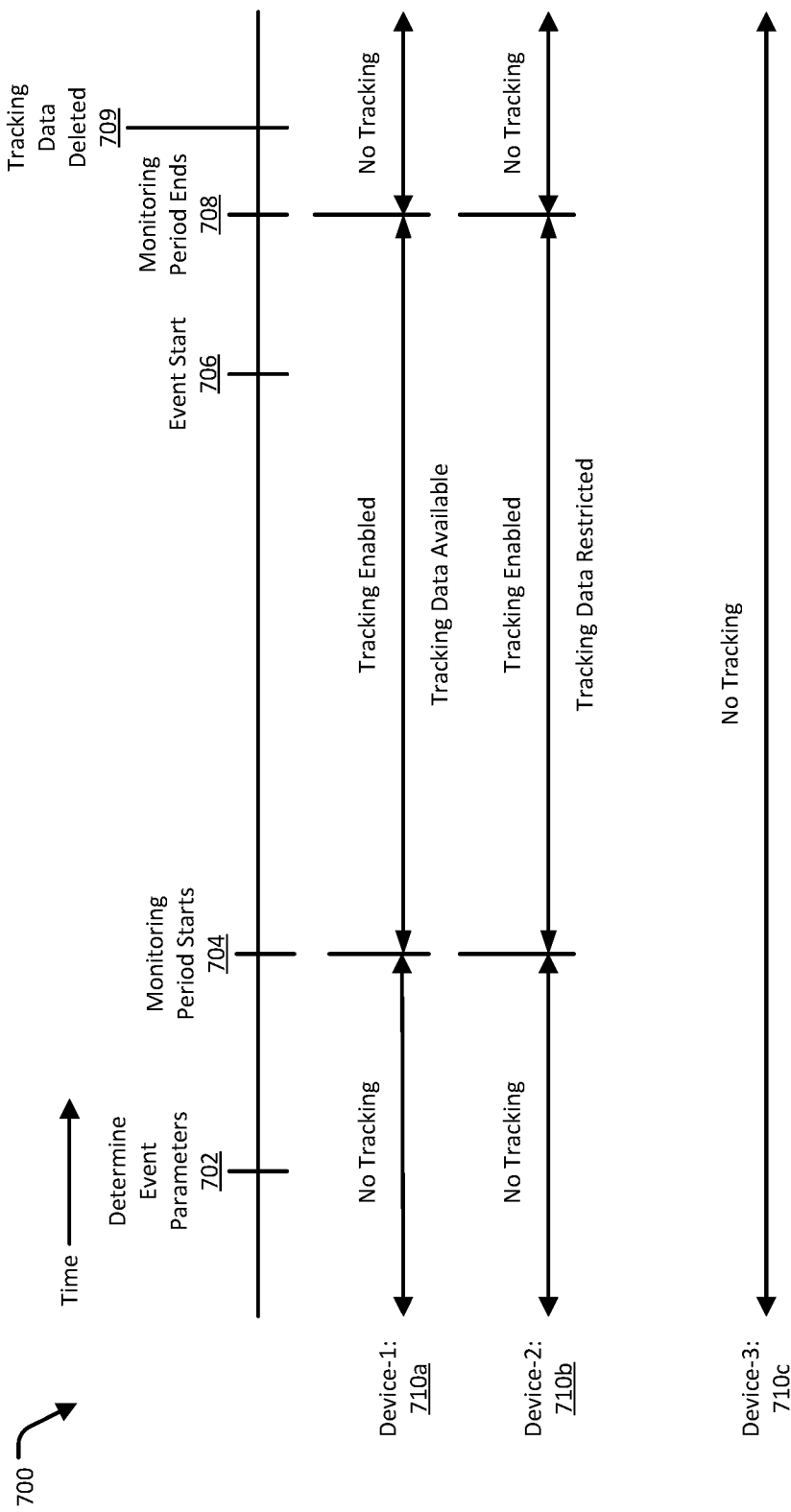
FIG. 7 is a diagram of an example timeline, which illustrates one example of a monitoring period relative to the timeframe of an event.

FIG. 7 is a diagram of an example timeline 700, which illustrates one example of a monitoring period relative to the timeframe of an event. In this example, the timeline 700 illustrates the activities of a monitoring service with respect to one event that has been registered with the monitoring service. As discussed further below, variations on the illustrated timeline 700 are possible. FIG. 7 further illustrates three devices 710a-710c that have been registered with the monitoring service, and the activities the monitoring service takes with respect to these three devices 710a-710c.

In the illustrated example, the event starts at time 706. The event start time can be recorded in a data entry in a calendar file, which a monitoring service can access to determine when the event will start. Alternatively or additionally, the monitoring service can include a data store in which the monitoring service stores calendar events that are to be monitored.

At a time 702 before the event start at time 706, the monitoring service can determine the event parameters. Time 702 can be a number of minutes, a number of hours, or a number of days before the start of the event. The event parameters can include a listing of the devices to be tracked. As an example, in the example of FIG. 7, a first device, Device-1 710a is associated with a user that has accepted an invitation to join the event (e.g., a status associated with the user indicates "accepted" or something similar). In this example, the monitoring service can, at time 702, add Device-1 710a to a list of devices for which the monitoring service will collect tracking data. As a further example, a second device, Device-2 710b, is also associated with a user that has accepted an invitation to join the event, and the monitoring service can also add Device-2 710b to the list of devices for which to collect tracking data. As a further example, a third device, Device-3 710c, is associated with a user who was invited to join the event, but who either did not accept the invitation or who did not respond (e.g., a status associated with the user is "invited" or "declined" or another status other than "accepted"). In this case, though Device-3

710c is associated with a user who was invited to the event, the monitoring service does not add the device to the list of devices to be tracked.

Also at time 702, the monitoring service can determine listing of devices that can receive the tracking data that is collected. For example, the event parameters can indicate that Device-1 710a and Device-2 710b are both associated with users who have accepted the invitation to join the event, and that these two devices thus can receive the tracking data. The monitoring service can further determine that Device-3 710c should not receive any of the tracking data, due to the user associated with this device having declined to join the event or having not responded to the invitation.

At time 702, the monitoring service can further determine the monitoring period. The start of the monitoring period can be relative to the start time of the event. In the example of FIG. 7, the monitoring period starts at a time 704, which is before the start time of the event. In this example, monitoring of the event has been configured so that event attendees can see when other attendees are arriving, and/or where the other attendees are prior to the start of the event. In other examples, the monitoring period can start when the event starts or after the event starts. In these examples, monitoring of the event may have been configured so that event attendees can locate one another after the event has started.

Also in the example of FIG. 7, the monitoring period stops at a time 708, shortly after the start time of the event. In this example, the end of the monitoring period may have been configured to be at a fixed time after the start of the event, and/or when a condition is met (such as certain attendees or all attendees arriving at the event location). In other examples, the monitoring period can end at the start of the event, at the end of the event (not illustrated here), or after the end of the event.

Having determined the monitoring period, the monitoring service can then wait until time 704 is reached. Time 704 can be a few minutes, a few hours, or a few days after time 702. Before time 704 is reached, the monitoring service will not be tracking any of the devices 710a-710c. The is, the monitoring service will not be collecting any tracking data from these devices 710a-710c, and will have no knowledge of the physical or network locations of the devices 710a-710c. When time 704 is reached, the monitoring service can activate tracking of Device-1 710a and Device-2 710b, and will not activate tracking of Device-3 710c. While tracking is activated, the monitoring service 620 can obtain tracking data for each of Device-1 710a and Device-2 710b, for example from the devices and/or from a data service.

Once tracking is enabled, the monitoring service may also make the tracking data available to devices that the monitoring service has identified as being able to receive the data. For example, in the example of FIG. 7, parameters for the event have configured the monitoring service to make the tracking data for both Device-1 710a and Device-2 710b available. Making the data available can mean, for example, that when either of the devices 710a-710b connect to the monitoring service, for example through an app executing on the devices 710a-710b, the devices 710a-710b can receive the tracking data. As another example, when the tracking data is available, the monitoring service may push (e.g., actively transmit) the tracking data to the devices 710a-710b. When the data is pushed to the device, the monitoring service may also cause a notification to be generated on the device, to inform a user that updated tracking data is available.

As noted above, the event parameters can also indicate the degree of detail of the tracking data that each device 710a-710b should receive. For example, the event parameters can indicate that the tracking data for Device-1 710a should be available to all devices that can receive the tracking data, which, in this example, includes only Device-1 710a and Device-2 710b. The event parameters may further indicate that the tracking data for Device-2 710b is restricted, meaning that the monitoring service should only give access to a limited amount of the tracking data for this device. For example, the event parameters may indicate that only an estimated time of arrival for time Device-2 710b should be available, or only an approximate distance of Device-2 710b from the event location. Alternatively, the event parameters may indicate that the tracking data for Device-2 710b should be hidden from Device-1 710a. In various examples, the restricted availability of the tracking data for Device-2 710b can be configured by the user associated with Device-2 710b, by the event owner, and/or by another user.

In various examples, between the start of the monitoring period at time 704 and the end of the monitoring period at time 708, the monitoring service can continuously or periodically (e.g., at intervals of five or ten minutes, or another time interval) obtain updated tracking data for each of Device-1 710a and Device-2 710b. The monitoring service can then use the updated tracking data to update each device's location and/or estimated time of arrival at the event location.

Once the end of the monitoring period is reached, at time 708, the monitoring service can stop collecting tracking data for the devices being tracked, and can stop providing the tracking data to the devices that can receive the data. Once tracking is disabled, the monitoring service will no longer have any information about the location of the devices 710a-710b, and, consequently, will not be able to provide location information for the devices 710a-710b to any devices.

At or after the end of the monitoring period, for example at a time 709, the monitoring service can further delete the tracking data obtained during the monitoring period, as well as any other data generated during the monitoring period (e.g., instant messages or chat messages, status messages, etc.). In some examples, the monitoring service may further delete all information about the event as well, including when the event occurred, where the event was located, which users were invited, which users indicated an intention to attend, and which actually attended, among other information. User accounts with the monitoring service, however, and user profiles associated with the accounts may be preserved, though the user's association with the event may be deleted. Time 709 may occur a few minutes after the end of the monitoring period (e.g., fifteen minutes, an hour, or some other amount of time). Alternatively or additionally, time 709 may occur on a scheduled basis. For example, the monitoring service may be configured to routinely (e.g., once a day, once a week, twice a week, etc.) delete tracking data. In this and other examples, time 709 may occur on a periodic basis.

The parameters that result in the example timeline 700 of FIG. 7 are associated with a specific event. A different event can have different parameters, that can result in a different timeline that involves the same or different devices.

FIG. 8 includes a flowchart illustrating an example of a process 800 for monitoring a calendar event. The example process 800 can be implemented by one or more server computers of a monitoring service, such as the monitoring service illustrated in FIG. 2.

At step 802, the process 800 of FIG. 8 includes receiving input corresponding to a calendar data entry, the calendar data entry adding an event to a calendar file, wherein the calendar data entry includes an event start time, an event geolocation, and a user identifier. The event start time can include a date and/or a time. In various examples, the calendar data entry is for adding a new calendar event to the calendar file. In some examples, the calendar data entry is received from a calendar application. For example, the input can be received using an API associated with the calendar application. In some examples, the calendar data entry is received from a calendar feed. For example, the monitoring service can be a client of the calendar feed, and thus automatically receive calendar data from the calendar feed. In some examples, the input can be an email, and can be received at an email server of the monitoring service. In some examples, the input is received from an application executing on a computing device, such as a user device. In these examples, the application can be a program that is part of the monitoring service.

The user identifier can identify a user that has been requested to join the calendar event. The user identifier can be associated with an entry in a database maintained by the monitoring service. The database can store user accounts for users registered with the monitoring service. In some examples, the entry for a user identifier can stored an association with a device, such as a smart phone, tablet computer, or other mobile computing device. In some examples, the entry can store an association with a calendar file or a calendar feed. In these examples, the calendar file or calendar feed is one that is used by the user for which the entry is maintained. For example, the calendar can be the user's Google or Outlook calendar. In some examples, the entry can store an email address. In these examples, the email address can be used to request for the user to join the calendar event. For example, the request can be sent to the email address.

In some examples, an entry for a user can store a list of identifiers of other users who can or cannot see the monitoring status of the user. For example, the entry can include a list of users who are "blocked" from seeing the user's monitoring status as determined for a particular event or for any event. The users can be identifier by a user identifier with the monitoring service, a user identifier for another service (e.g., a Google identifier, a social media identifier, etc.), an email address, a phone number, a first and/or last name, or some other identifier.

In some examples, an entry for a user can store a visibility setting. In these examples, the visibility setting can control display of the user's monitoring status on the devices of other users. For example, the visibility setting can indicate whether a high level of tracking detail should be displayed for the user (e.g., an exact geolocation), an intermediate level of detail (e.g., an approximate distance from the event location), or a low level of detail (e.g., an estimated arrival time and no location information). Additionally, the visibility setting can indicate the level of detail that other users can see. For example, for one user (e.g., a user account used by a spouse), a user may want a high-level of tracking detail provided, while for another user (e.g., a user account of a co-worker), the user may want an intermediate level of tracking detail provided.

In some examples, the process 800 can further include determining whether the user identifier is associated with an entry in the user database. In various examples, to use the monitoring service, a user registers with the service. To determine whether the user has previously registered, the monitoring service can check whether the service's user database has an entry for the user. The user can be identified, for example, by a user identifier, an email address, a social media handle, a phone number, or another identifier. The process 800 can further include generating, when the user identifier is not associated with an entry, a request to be added to the database, and transmitting the request using contact information associated with the user identifier. The contact information can be, for example, an email address, a phone number, or another form of digital contact information. The request can include information about the monitoring service and information about how to register with the monitoring service and/or a link for registering. When a user registers with the monitoring service, the monitoring service can generate a new entry for the user, and add the new entry to the user database. In various examples, when the user registers, the user can designate a computing device that can be tracked when tracking is enabled, and the monitoring service can store identification information for the computing device (e.g., a MAC address, an IMEI number, or another identifier) in the user's database entry.

In various examples, the process 800 can further include receiving input corresponding to a response to the calendar event. The input can indicate whether a user has accepted the request to join the calendar event, rejected the request, has responded "tentative," "maybe," or "uncertain," and/or has only viewed the request without responding. In these examples, the process 800 can further include modifying the status associated with the user identifier based on the response. Before modification, the status an indicate, for example, "invited," and after modification can indicate "accepted," "declined" or otherwise not attending, "tentative" or otherwise uncertain, or can still be only "invited" but indicate that the user has at least viewed the request.

In various examples, the calendar data entry received at step 802 can include a plurality of user identifiers, each corresponding to a user that has been requested to join the calendar event.

At step 804, the process 800 includes, at a first point in time relative to the event start time, obtaining tracking data for a device associated with the user identifier. In some examples, the tracking data is obtained from a geolocation data service. Alternatively or additionally, in some examples, the tracking data is obtained from the device. In some examples, the tracking data includes a geolocation (e.g., a geographic location) for the device.

In some examples, the first point in time is before the event start time. In these examples, an interval of time passes between the first point in time and the event start time. In some examples, the first point of time is at the event start time.

In some examples, the process 800 further includes determining an event status associated with the user identifier, the event status indicating that a user associated with the user identifier has accepted a request to be included in the event. In these examples, the process 800 can further include enabling, based on the event status indicating acceptance of the request, obtaining of the tracking data. When a user has not accepted a request to be included in the event, tracking a device associated with the user will not be enabled. For example, the process 800 can include determining an event status for a second user identifier, wherein the second user identifier is included in the calendar data entry. In this example, event status for the second user identifier can indicate that a user associated with the second user identifier has declined a request to be included in the event. In this example, based on the event status indicating non-acceptance, obtaining of tracking data for the second user identifier is not enabled.

At step 806, the process 800 includes determining, using the tracking data, an approximate geolocation of the device. The geolocation can be based on GPS data for the device, cellular antenna data, network data, and/or other positioning data. As such, the accuracy of the device's geolocation can be dependent on the technology used to obtain the geolocation. The geolocation can be an address on a map, a latitude and longitude, coordinates, or another format for recording a location on the globe.

At step 808, the process 800 includes determining, using the approximate geolocation, an approximate time difference between a current time and a time when the device will be at the event geolocation. In some examples, the approximate time difference is computed using a distance between the device and the event geolocation. In some examples, the approximate time difference is computing use a rate of movement of the device.

At step 810, the process 800 includes updating a location status associated with the user identifier, the location status indicating the approximate time difference. In some examples, the location status can indicate an amount of time until the device is to reach the event geolocation. In some examples, the status indicates a distance between the device and the event geolocation. In some examples, the status indicates a geolocation of the device. In some examples, the status indicates a projected route of the device from a current geolocation of the device to the event geolocation.

In some examples, the process 800 can further include determining a display level associated with the user identifier, the display level indicating an amount of detail of the location status. For example, the display level can indicate a high degree of detail, an intermediate degree of detail, or a low degree of detail. The process 800 can further include outputting the location status according to the display level. The location status can be output to a second device. The second device can be associated with a second user identifier, where the second user identifier is also included in the calendar data entry. An event status associated with the second user identifier can indicate that a user associated with the second user identifier has accepted a request to be included in the event. Outputting of the location status to the second device enabled based on the event status of the second user (e.g., that the user has accepted the request).

In some examples, the process 800 can include enabling the second device to receive the event status associated with the user identifier. In these examples, the second device can retrieve the event status from the monitoring service. In some examples, the event status can be actively transmitted (e.g., "pushed") to the second device.

At step 812, the process 800 includes at a second point in time relative to the event start time, disabling tracking of the device. In some examples, the second point in time is at the event start time. In some examples, the second point in time is after the event start time, such as a few minutes after the event start time and/or when some or all of the attendee users arrive at the event geolocation. In some examples, the second point in time is at the end time associated with the calendar event.

At step 814, the process 800 includes at a third point in time after the second point in time, deleting the tracking data. The tracking data that is deleted can include any tracking data obtained between the first point in time and the second point in time. In various examples, the location status associated with the user identifier, as determined between the first point in time and the second point in time, is also deleted. In these and other examples, the location status has a null value before the first point in time and is deleted at the third point in time, so that the location status again has a null value.

In some examples, the process 800 can also include determining an event status for a second user identifier, where the second user identifier was also included in the calendar data entry. In these examples, the event status for the second user identifier can indicate that a user associated with the second user identifier has declined a request to be included in the event. In these examples, based on this event status, the second user identifier is not able to obtain the location status associated with the user identifier. Additionally, a device associated with the second user identifier will not be tracked between the first point in time and the second point in time, such that no location data for the device of the second user will be obtained.

Specific details were given in the preceding description to provide a thorough understanding of various examples of systems and components for an event monitoring system. It will be understood by one of ordinary skill in the art, however, that the examples described above may be practiced without these specific details. For example, circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples.

It is also noted that individual implementations may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

The various examples discussed above may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments). One or more processors, implemented in an integrated circuit, may perform the necessary tasks.

Where components are described as being "configured to" or "operable to" perform certain operations, such configuration or operation can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the examples presented herein.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated circuit logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor (which may include one or more processors or processor cores), such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules.

What is claimed is:

1. A computer-implemented method, comprising
    receiving, at a server computer, input corresponding to a calendar data entry, the calendar data entry adding an event to a calendar file, wherein the calendar data entry includes an event start time, an event geolocation, a first user identifier, a second user identifier, and a third user identifier;
    determining a first event status associated with the first user identifier, the first event status indicating that a first user associated with the first user identifier has accepted a first request to be included in the event;
    upon determining that the first request to be included in the event has been accepted, enabling obtaining of first tracking data for a first smart phone associated with the first user identifier starting from a first point in time relative to the event start time;
    determining a second event status associated with the second user identifier, the second event status indicating that a second user associated with the second user identifier has accepted a second request to be included in the event;
    upon determining that the second request to be included in the event has been accepted, enabling obtaining of second tracking data for a second smart phone associated with the second user identifier starting from the first point in time relative to the event start time;
    determining a third event status associated with the third user identifier, the third event status indicating that a third user associated with the third user identifier has accepted a third request to be included in the event;
    upon determining that the third request to be included in the event has been accepted, enabling obtaining of third tracking data for a third smart phone associated with the first user identifier starting from a first point in time relative to the event start time;
    at the first point in time relative to the event start time, activating obtaining of the first tracking data for the first smart phone associated with the first user identifier, activating obtaining of the second tracking data for the second smart phone associated with the second user identifier, and activating obtaining of the third tracking data for the third smart phone associated with the third user identifier;
    determining one or more of a first approximate geolocation of the first smart phone, a first approximate time difference between a current time and a first time when the first smart phone will be at the event geolocation, or a first approximate distance difference between the first approximate geolocation and the event geolocation;

updating a first location status associated with the first user identifier, the first location status indicating one or more of the first approximate geolocation, the first approximate time difference, or the first approximate distance difference;

transmitting the first location status to the second smart phone and the third smart phone;

determining one or more of a second approximate geolocation of the second smart phone, a second approximate time difference between the current time and a second time when the second smart phone will be at the event geolocation, or a second approximate distance difference between the second approximate geolocation and the event geolocation;

updating a second location status associated with the second user identifier, the second location status indicating one or more of the second approximate geolocation, the second approximate time difference, or the second approximate distance difference;

transmitting the second location status to the first smart phone and the third smart phone;

determining one or more of a third approximate geolocation of the third smart phone, a third approximate time difference between the current time and a third time when the third smart phone will be at the event geolocation, or a third approximate distance difference between the third approximate geolocation and the event geolocation;

updating a third location status associated with the third user identifier, the third location status indicating one or more of the third approximate geolocation, the third approximate time difference, or the third approximate distance difference;

transmitting the third location status to the first smart phone and the second smart phone; and at a second point in time relative to the event start time, disabling tracking of the first smart phone, the second smart phone, and the third smart phone.

2. The computer-implemented method of claim 1, further comprising:

determining an updated third event status associated with the third user identifier, the updated third event status indicating that the third user associated with the third user identifier has declined the third request to be included in the event; and upon determining that the third request to be included in the event has been declined, disabling tracking of the third smart phone associated with the third user identifier, disabling transmitting of the first location status and the second location status to the third smart phone, and disabling transmitting of the third location status to the first smart phone and the second smart phone.

3. The computer-implemented method of claim 1, wherein determining one or more of an approximate geolocation of a smart phone, an approximate time difference between the current time and a time when the smart phone will be at the event geolocation, or an approximate distance difference between the approximate geolocation and the event geolocation includes:

receiving, from the smart phone, one or more of the approximate geolocation of the smart phone, the approximate time difference between the current time and the time when the smart phone will be at the event geolocation, or the approximate distance difference between the approximate geolocation and the event geolocation; or receiving, from the smart phone, tracking data or information derived from the tracking data and computing, using the tracking data or information derived from the tracking data, one or more of the approximate geolocation of the smart phone, the approximate time difference between the current time and the time when the smart phone will be at the event geolocation, or the approximate distance difference between the approximate geolocation and the event geolocation.

4. The computer-implemented method of claim 1, further comprising:

determining a fourth event status associated with a fourth user identifier included in the calendar data entry, the fourth event status indicating that a fourth user associated with the fourth user identifier has accepted a fourth request to be included in the event;

upon determining that the fourth request to be included in the event has been accepted, enabling obtaining of fourth tracking data for a fourth smart phone associated with the fourth user identifier starting from the first point in time relative to the event start time;

at the first point in time relative to the event start time, activating obtaining of the fourth tracking data for the third smart phone associated with the fourth user identifier;

determining one or more of a fourth approximate geolocation of the fourth smart phone, a fourth approximate time difference between the current time and a fourth time when the fourth smart phone will be at the event geolocation, and a fourth approximate distance difference between the fourth approximate geolocation and the event geolocation;

updating a fourth location status associated with the fourth user identifier, the fourth location status indicating one or more of the fourth approximate geolocation, the fourth approximate time difference, or the fourth approximate distance difference;

transmitting the fourth location status to the first smart phone, the second smart phone, and the third smart phone;

transmitting the first location status, the second location status, and the third location status to the fourth smart phone; and at the second point in time relative to the event start time, further disabling tracking of the fourth smart phone.

5. The computer-implemented method of claim 1, further comprising:

determining a first display level associated with the first user identifier, the first display level indicating a first amount of detail of the first location status;

outputting the first location status according to the first display level, wherein the first location status is output to the second smart phone and the third smart phone;

determining a second display level associated with the second user identifier, the second display level indicating a second amount of detail of the second location status;

outputting the second location status according to the second display level, wherein the second location status is output to the first smart phone and the third smart phone;

determining a third display level associated with the third user identifier, the third display level indicating a third amount of detail of the third location status; and outputting the third location status according to the third display level, wherein the third location status is output to the first smart phone and the second smart phone.

6. The computer-implemented method of claim 1, further comprising:
prior to the first point in time, establishing an event-specific group chat room;
upon determining that the first request to be included in the event has been accepted, associating the first user identifier with the event-specific group chat room;
upon determining that the second request to be included in the event has been accepted, associating the second user identifier with the event-specific group chat room;
upon determining that the third request to be included in the event has been accepted, associating the third user identifier with the event-specific group chat room;
receiving first messaging information from the first smart phone;
outputting the first messaging information to the event-specific group chat room by transmitting the first messaging information to the second smart phone and the third smart phone;
receiving second messaging information from the second smart phone;
outputting the second messaging information to the event-specific group chat room by transmitting the second messaging information to the first smart phone and the third smart phone;
receiving third messaging information from the third smart phone; and
outputting the second messaging information to the event-specific group chat room by transmitting the third messaging information to the first smart phone and the second smart phone.

7. The computer-implemented method of claim 1, further comprising:
at a third point in time after the second point in time, deleting the first tracking data, the second tracking data, and the third tracking data.

8. A computing device comprising:
one or more processors; and
a non-transitory computer-readable medium including instructions that, when executed by the one or more processors, cause the one or more processors to perform operations including:
receiving input corresponding to a calendar data entry, the calendar data entry adding an event to a calendar file, wherein the calendar data entry includes an event start time, an event geolocation, a first user identifier, a second user identifier, and a third user identifier;
determining a first event status associated with the first user identifier, the first event status indicating that a first user associated with the first user identifier has accepted a first request to be included in the event;
upon determining that the first request to be included in the event has been accepted, enabling obtaining of first tracking data for a first smart phone associated with the first user identifier starting from a first point in time relative to the event start time;
determining a second event status associated with the second user identifier, the second event status indicating that a second user associated with the second user identifier has accepted a second request to be included in the event;
upon determining that the second request to be included in the event has been accepted, enabling obtaining of second tracking data for a second smart phone associated with the second user identifier starting from the first point in time relative to the event start time;
determining a third event status associated with the third user identifier, the third event status indicating that a third user associated with the third user identifier has accepted a third request to be included in the event;
upon determining that the third request to be included in the event has been accepted, enabling obtaining of third tracking data for a third smart phone associated with the first user identifier starting from a first point in time relative to the event start time;
at the first point in time relative to the event start time, activating obtaining of the first tracking data for the first smart phone associated with the first user identifier, activating obtaining of the second tracking data for the second smart phone associated with the second user identifier, and activating obtaining of the third tracking data for the third smart phone associated with the third user identifier;
determining one or more of a first approximate geolocation of the first smart phone, a first approximate time difference between a current time and a first time when the first smart phone will be at the event geolocation, or a first approximate distance difference between the first approximate geolocation and the event geolocation;
updating a first location status associated with the first user identifier, the first location status indicating one or more of the first approximate geolocation, the first approximate time difference, or the first approximate distance difference;
transmitting the first location status to the second smart phone and the third smart phone;
determining one or more of a second approximate geolocation of the second smart phone, a second approximate time difference between the current time and a second time when the second smart phone will be at the event geolocation, or a second approximate distance difference between the second approximate geolocation and the event geolocation;
updating a second location status associated with the second user identifier, the second location status indicating one or more of the second approximate geolocation, the second approximate time difference, or the second approximate distance difference;
transmitting the second location status to the first smart phone and the third smart phone;
determining one or more of a third approximate geolocation of the third smart phone, a third approximate time difference between the current time and a third time when the third smart phone will be at the event geolocation, or a third approximate distance difference between the third approximate geolocation and the event geolocation;
updating a third location status associated with the third user identifier, the third location status indicating one or more of the third approximate geolocation, the third approximate time difference, or the third approximate distance difference;
transmitting the third location status to the first smart phone and the second smart phone; and
at a second point in time relative to the event start time, disabling tracking of the first smart phone, the second smart phone, and the third smart phone.

9. The computing device of claim 8, wherein the operations further include:
- determining an updated third event status associated with the third user identifier, the updated third event status indicating that the third user associated with the third user identifier has declined the third request to be included in the event; and
- upon determining that the third request to be included in the event has been declined, disabling tracking of the third smart phone associated with the third user identifier, disabling transmitting of the first location status and the second location status to the third smart phone, and disabling transmitting of the third location status to the first smart phone and the second smart phone.

10. The computing device of claim 8, wherein determining one or more of an approximate geolocation of a smart phone, an approximate time difference between the current time and a time when the smart phone will be at the event geolocation, or an approximate distance difference between the approximate geolocation and the event geolocation includes:
- receiving, from the smart phone, one or more of the approximate geolocation of the smart phone, the approximate time difference between the current time and the time when the smart phone will be at the event geolocation, or the approximate distance difference between the approximate geolocation and the event geolocation; or
- receiving, from the smart phone, tracking data or information derived from the tracking data and computing, using the tracking data or information derived from the tracking data, one or more of the approximate geolocation of the smart phone, the approximate time difference between the current time and the time when the smart phone will be at the event geolocation, or the approximate distance difference between the approximate geolocation and the event geolocation.

11. The computing device of claim 8, wherein the operations further include:
- determining a fourth event status associated with a fourth user identifier included in the calendar data entry, the fourth event status indicating that a fourth user associated with the fourth user identifier has accepted a fourth request to be included in the event;
- upon determining that the fourth request to be included in the event has been accepted, enabling obtaining of fourth tracking data for a fourth smart phone associated with the fourth user identifier starting from the first point in time relative to the event start time;
- at the first point in time relative to the event start time, activating obtaining of the fourth tracking data for the third smart phone associated with the fourth user identifier;
- determining one or more of a fourth approximate geolocation of the fourth smart phone, a fourth approximate time difference between the current time and a fourth time when the fourth smart phone will be at the event geolocation, and a fourth approximate distance difference between the fourth approximate geolocation and the event geolocation;
- updating a fourth location status associated with the fourth user identifier, the fourth location status indicating one or more of the fourth approximate geolocation, the fourth approximate time difference, or the fourth approximate distance difference;
- transmitting the fourth location status to the first smart phone, the second smart phone, and the third smart phone;
- transmitting the first location status, the second location status, and the third location status to the fourth smart phone; and
- at the second point in time relative to the event start time, further disabling tracking of the fourth smart phone.

12. The computing device of claim 8, wherein the operations further include:
- determining a first display level associated with the first user identifier, the first display level indicating a first amount of detail of the first location status;
- outputting the first location status according to the first display level, wherein the first location status is output to the second smart phone and the third smart phone;
- determining a second display level associated with the second user identifier, the second display level indicating a second amount of detail of the second location status;
- outputting the second location status according to the second display level, wherein the second location status is output to the first smart phone and the third smart phone;
- determining a third display level associated with the third user identifier, the third display level indicating a third amount of detail of the third location status; and
- outputting the third location status according to the third display level, wherein the third location status is output to the first smart phone and the second smart phone.

13. The computing device of claim 8, wherein the operations further include:
- prior to the first point in time, establishing an event-specific group chat room;
- upon determining that the first request to be included in the event has been accepted, associating the first user identifier with the event-specific group chat room;
- upon determining that the second request to be included in the event has been accepted, associating the second user identifier with the event-specific group chat room;
- upon determining that the third request to be included in the event has been accepted, associating the third user identifier with the event-specific group chat room;
- receiving first messaging information from the first smart phone;
- outputting the first messaging information to the event-specific group chat room by transmitting the first messaging information to the second smart phone and the third smart phone;
- receiving second messaging information from the second smart phone;
- outputting the second messaging information to the event-specific group chat room by transmitting the second messaging information to the first smart phone and the third smart phone;
- receiving third messaging information from the third smart phone; and
- outputting the second messaging information to the event-specific group chat room by transmitting the third messaging information to the first smart phone and the second smart phone.

14. The computing device of claim 13, wherein the operations further comprise:
- at a third point in time after the second point in time, deleting the first tracking data, the second tracking data, and the third tracking data.

15. A computer-program product tangibly embodied in a non-transitory machine-readable storage medium, including instructions that, when executed by one or more processors of a computing device, cause the one or more processors to perform operations including:
  receiving input corresponding to a calendar data entry, the calendar data entry adding an event to a calendar file, wherein the calendar data entry includes an event start time, an event geolocation, a first user identifier, a second user identifier, and a third user identifier;
  determining a first event status associated with the first user identifier, the first event status indicating that a first user associated with the first user identifier has accepted a first request to be included in the event;
  upon determining that the first request to be included in the event has been accepted, enabling obtaining of first tracking data for a first smart phone associated with the first user identifier starting from a first point in time relative to the event start time;
  determining a second event status associated with the second user identifier, the second event status indicating that a second user associated with the second user identifier has accepted a second request to be included in the event;
  upon determining that the second request to be included in the event has been accepted, enabling obtaining of second tracking data for a second smart phone associated with the second user identifier starting from the first point in time relative to the event start time;
  determining a third event status associated with the third user identifier, the third event status indicating that a third user associated with the third user identifier has accepted a third request to be included in the event;
  upon determining that the third request to be included in the event has been accepted, enabling obtaining of third tracking data for a third smart phone associated with the first user identifier starting from a first point in time relative to the event start time;
  at the first point in time relative to the event start time, activating obtaining of the first tracking data for the first smart phone associated with the first user identifier, activating obtaining of the second tracking data for the second smart phone associated with the second user identifier, and activating obtaining of the third tracking data for the third smart phone associated with the third user identifier;
  determining one or more of a first approximate geolocation of the first smart phone, a first approximate time difference between a current time and a first time when the first smart phone will be at the event geolocation, or a first approximate distance difference between the first approximate geolocation and the event geolocation;
  updating a first location status associated with the first user identifier, the first location status indicating one or more of the first approximate geolocation, the first approximate time difference, or the first approximate distance difference;
  transmitting the first location status to the second smart phone and the third smart phone;
  determining one or more of a second approximate geolocation of the second smart phone, a second approximate time difference between the current time and a second time when the second smart phone will be at the event geolocation, or a second approximate distance difference between the second approximate geolocation and the event geolocation;
  updating a second location status associated with the second user identifier, the second location status indicating one or more of the second approximate geolocation, the second approximate time difference, or the second approximate distance difference;
  transmitting the second location status to the first smart phone and the third smart phone;
  determining one or more of a third approximate geolocation of the third smart phone, a third approximate time difference between the current time and a third time when the third smart phone will be at the event geolocation, or a third approximate distance difference between the third approximate geolocation and the event geolocation;
  updating a third location status associated with the third user identifier, the third location status indicating one or more of the third approximate geolocation, the third approximate time difference, or the third approximate distance difference;
  transmitting the third location status to the first smart phone and the second smart phone; and
  at a second point in time relative to the event start time, disabling tracking of the first smart phone, the second smart phone, and the third smart phone.

16. The computer-program product of claim 15, wherein the operations further include:
  determining an updated third event status associated with the third user identifier, the updated third event status indicating that the third user associated with the third user identifier has declined the third request to be included in the event; and
  upon determining that the third request to be included in the event has been declined, disabling tracking of the third smart phone associated with the third user identifier, disabling transmitting of the first location status and the second location status to the third smart phone, and disabling transmitting of the third location status to the first smart phone and the second smart phone.

17. The computer-program product of claim 15, wherein determining one or more of an approximate geolocation of a smart phone, an approximate time difference between the current time and a time when the smart phone will be at the event geolocation, or an approximate distance difference between the approximate geolocation and the event geolocation includes:
  receiving, from the smart phone, one or more of the approximate geolocation of the smart phone, the approximate time difference between the current time and the time when the smart phone will be at the event geolocation, or the approximate distance difference between the approximate geolocation and the event geolocation; or
  receiving, from the smart phone, tracking data or information derived from the tracking data and computing, using the tracking data or information derived from the tracking data, one or more of the approximate geolocation of the smart phone, the approximate time difference between the current time and the time when the smart phone will be at the event geolocation, or the approximate distance difference between the approximate geolocation and the event geolocation.

18. The computer-program product of claim 15, wherein the operations further include:
  determining a fourth event status associated with a fourth user identifier included in the calendar data entry, the fourth event status indicating that a fourth user associated with the fourth user identifier has accepted a fourth request to be included in the event;

upon determining that the fourth request to be included in the event has been accepted, enabling obtaining of fourth tracking data for a fourth smart phone associated with the fourth user identifier starting from the first point in time relative to the event start time;

at the first point in time relative to the event start time, activating obtaining of the fourth tracking data for the third smart phone associated with the fourth user identifier;

determining one or more of a fourth approximate geolocation of the fourth smart phone, a fourth approximate time difference between the current time and a fourth time when the fourth smart phone will be at the event geolocation, and a fourth approximate distance difference between the fourth approximate geolocation and the event geolocation;

updating a fourth location status associated with the fourth user identifier, the fourth location status indicating one or more of the fourth approximate geolocation, the fourth approximate time difference, or the fourth approximate distance difference;

transmitting the fourth location status to the first smart phone, the second smart phone, and the third smart phone;

transmitting the first location status, the second location status, and the third location status to the fourth smart phone; and at the second point in time relative to the event start time, further disabling tracking of the fourth smart phone.

19. The computer-program product of claim 15, wherein the operations further include:

determining a first display level associated with the first user identifier, the first display level indicating a first amount of detail of the first location status;

outputting the first location status according to the first display level, wherein the first location status is output to the second smart phone and the third smart phone;

determining a second display level associated with the second user identifier, the second display level indicating a second amount of detail of the second location status;

outputting the second location status according to the second display level, wherein the second location status is output to the first smart phone and the third smart phone;

determining a third display level associated with the third user identifier, the third display level indicating a third amount of detail of the third location status; and outputting the third location status according to the third display level, wherein the third location status is output to the first smart phone and the second smart phone.

20. The computer-program product of claim 15, wherein the operations further include:

prior to the first point in time, establishing an event-specific group chat room;

upon determining that the first request to be included in the event has been accepted, associating the first user identifier with the event-specific group chat room;

upon determining that the second request to be included in the event has been accepted, associating the second user identifier with the event-specific group chat room;

upon determining that the third request to be included in the event has been accepted, associating the third user identifier with the event-specific group chat room;

receiving first messaging information from the first smart phone;

outputting the first messaging information to the event-specific group chat room by transmitting the first messaging information to the second smart phone and the third smart phone;

receiving second messaging information from the second smart phone;

outputting the second messaging information to the event-specific group chat room by transmitting the second messaging information to the first smart phone and the third smart phone;

receiving third messaging information from the third smart phone; and outputting the second messaging information to the event-specific group chat room by transmitting the third messaging information to the first smart phone and the second smart phone.

21. The computer-program product of claim 15, wherein the operations further include:

at a third point in time after the second point in time, deleting the first tracking data, the second tracking data, and the third tracking data.

* * * * *